(12) United States Patent
Yu et al.

(10) Patent No.: US 10,338,727 B2
(45) Date of Patent: Jul. 2, 2019

(54) DISPLAY DEVICE AND METHOD FOR DRIVING SAME

(71) Applicant: LG Display Co., Ltd., Seoul (KR)

(72) Inventors: Sang Hee Yu, Gyeonggi-do (KR); Hun Jeoung, Gyeonggi-do (KR); Sung Hyun Cho, Seoul (KR); Bo Sun Lee, Chungcheongbuk-do (KR); Sung Wook Chang, Gyeonggi-do (KR)

(73) Assignee: LG DISPLAY CO., LTD., Seoul (KR)

( * ) Notice: Subject to any disclaimer, the term of this patent is extended or adjusted under 35 U.S.C. 154(b) by 93 days.

(21) Appl. No.: 15/261,796

(22) Filed: Sep. 9, 2016

(65) Prior Publication Data

US 2017/0052635 A1    Feb. 23, 2017

Related U.S. Application Data

(63) Continuation of application No. PCT/KR2015/002306, filed on Mar. 10, 2015.

(60) Provisional application No. 61/950,705, filed on Mar. 10, 2014.

(51) Int. Cl.
| | | |
|---|---|---|
| *G06F 3/041* | (2006.01) | |
| *G06F 3/044* | (2006.01) | |
| *G09G 3/36* | (2006.01) | |
| *G09G 3/20* | (2006.01) | |

(52) U.S. Cl.
CPC ............ *G06F 3/0416* (2013.01); *G06F 3/044* (2013.01); *G06F 3/0412* (2013.01); *G09G 3/20* (2013.01); *G09G 3/3677* (2013.01); *G09G 3/3688* (2013.01); *G09G 2300/0408* (2013.01); *G09G 2310/0267* (2013.01); *G09G 2310/0281* (2013.01); *G09G 2310/0283* (2013.01); *G09G 2310/0286* (2013.01); *G09G 2310/08* (2013.01)

(58) Field of Classification Search
None
See application file for complete search history.

(56) References Cited

U.S. PATENT DOCUMENTS

| | | | | |
|---|---|---|---|---|
| 2007/0216634 | A1* | 9/2007 | Kim | ................. G09G 3/3677 345/100 |
| 2011/0273408 | A1* | 11/2011 | Ra | ..................... G09G 3/3266 345/204 |
| 2012/0001894 | A1* | 1/2012 | Kim | ................. G09G 3/3677 345/213 |
| 2015/0091822 | A1* | 4/2015 | Dong | ................ G06F 3/0416 345/173 |

(Continued)

FOREIGN PATENT DOCUMENTS

| | | | |
|---|---|---|---|
| CN | 201310456249 | * | 9/2013 |
| KR | 10-2007-0028727 | | 3/2007 |

(Continued)

OTHER PUBLICATIONS

International Search Report for PCT Application No. PCT/KR2015/002306, dated Jun. 25, 2015, 4 Pages (With Concise Explanation of Relevance).

*Primary Examiner* — Ifedayo B Iluyomade
(74) *Attorney, Agent, or Firm* — Fenwick & West LLP

(57) ABSTRACT

Present invention is related to a display device and a driving method thereof, and particularly, to a display device and a driving method thereof, which control an output timing of a scan signal output to gate lines by using two or more external start signals having different timings.

27 Claims, 25 Drawing Sheets

(56) References Cited

U.S. PATENT DOCUMENTS

2015/0269897 A1* 9/2015 Kitsomboonloha .......................... G09G 3/3648
  345/205

FOREIGN PATENT DOCUMENTS

| KR | 10-2008-0060824 | 7/2008 |
| KR | 10-2011-0123529 | 11/2011 |
| KR | 10-2012-0002883 | 1/2012 |
| KR | 10-2013-0056410 | 5/2013 |

* cited by examiner

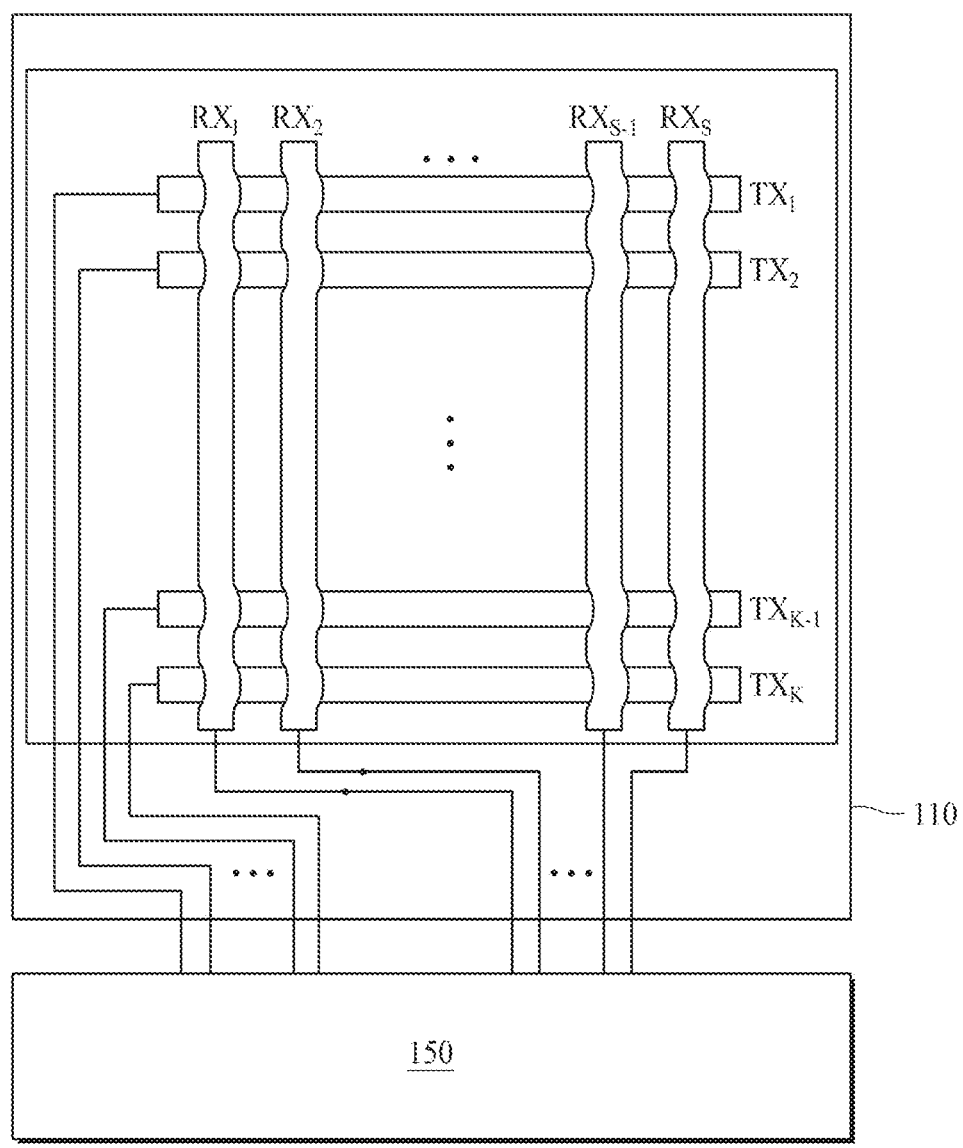

FIG. 6
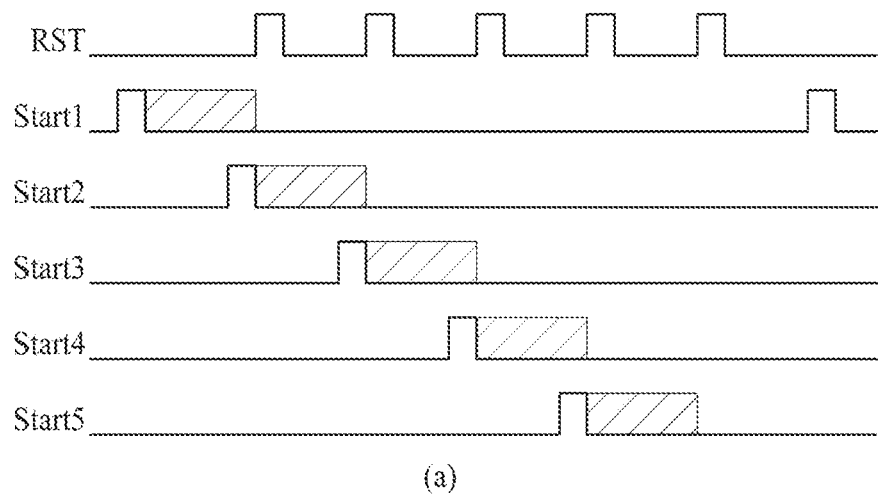
(a)
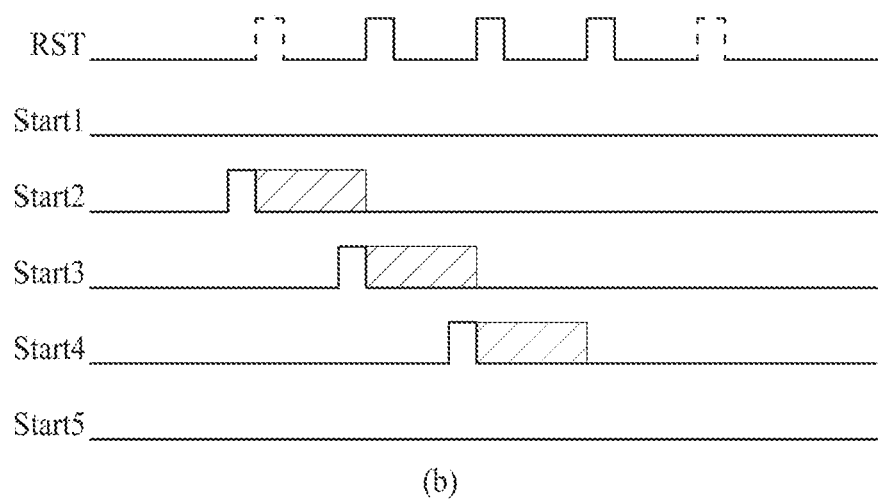
(b)

FIG. 8
(a)
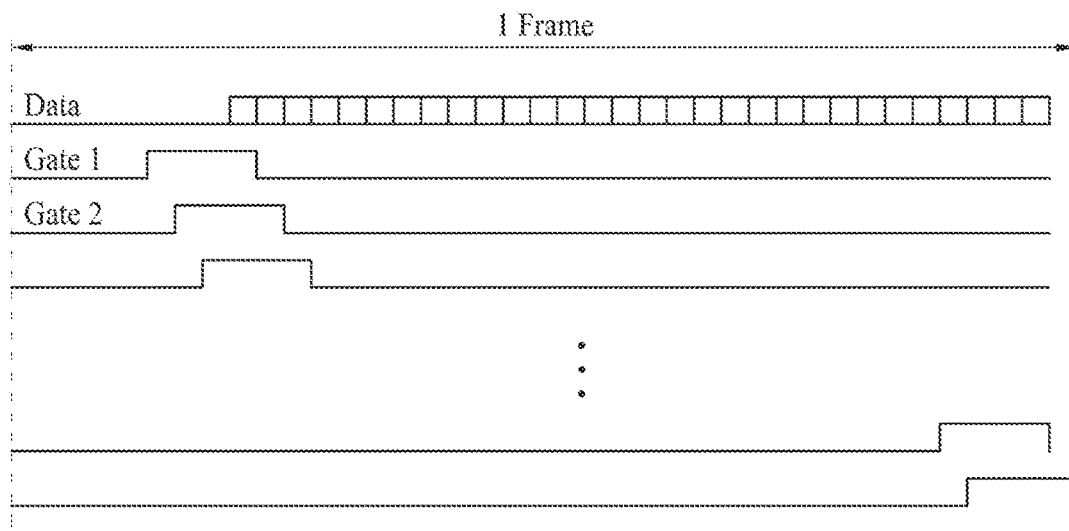
(b)
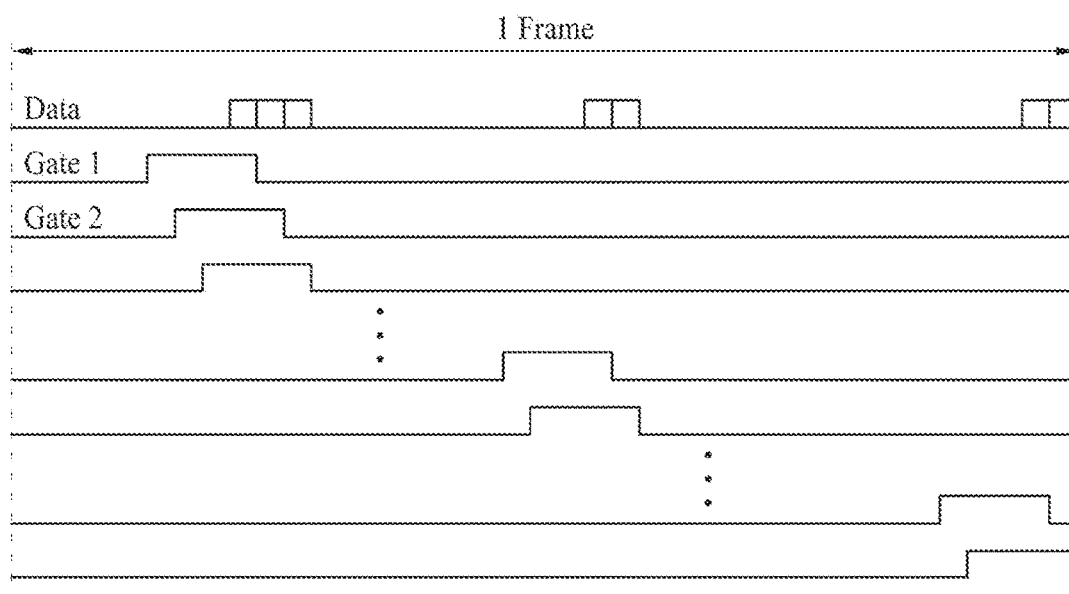

FIG. 16A
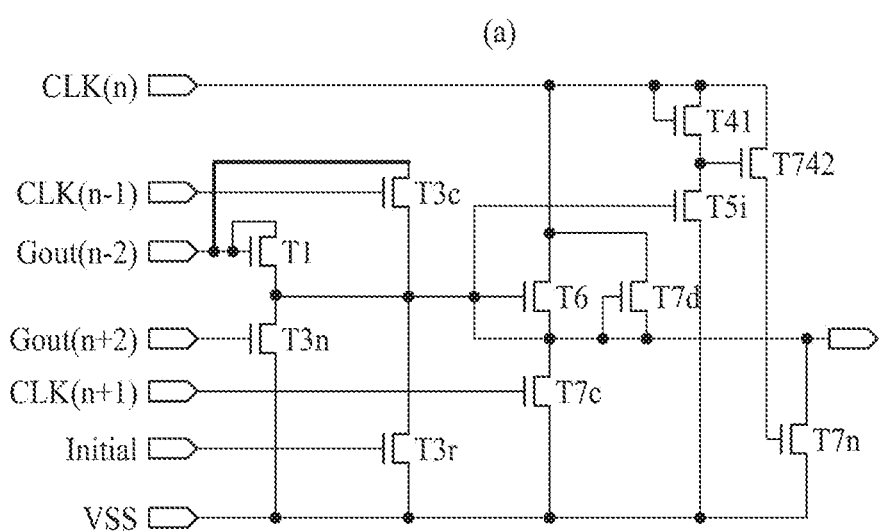
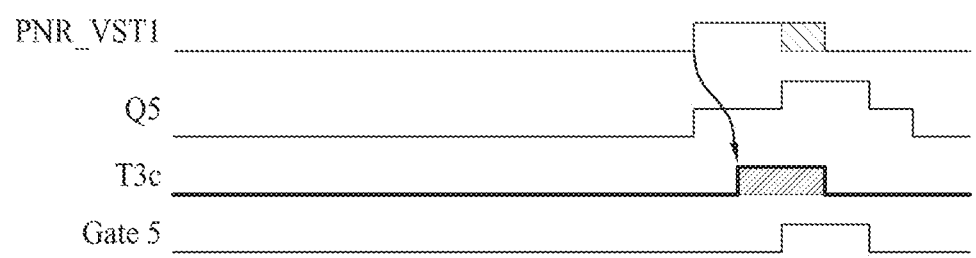

DISPLAY DEVICE AND METHOD FOR DRIVING SAME

CROSS-REFERENCE TO RELATED APPLICATION

This application is a continuation application of co-pending PCT application no. PCT/KR2015/002306 filed on Mar. 10, 2015, which claims priority to U.S. Provisional Application Ser. No. 61/950,705 filed on Mar. 10, 2014, which are incorporated by reference herein in their entirety.

TECHNICAL FIELD

The present invention relates to a display device, and particularly, to a display device and a driving method thereof, which decrease consumption power.

BACKGROUND ART

A flat panel display (FPD) device is applied to various kinds of electronic devices such as portable phones, tablet personal computers (PCs), notebook computers, etc. Examples of the FPD device include liquid crystal display (LCD) devices, plasma display panels (PDPs), organic light emitting display devices, etc. Recently, electrophoretic display (EPD) devices are being widely used as one type of the FPD device.

In such FPD devices (hereinafter simply referred to as a display device), the LCD devices are devices that display an image by using the optical anisotropy of liquid crystal. The LCD devices have good features such as thinness, lightness, low consumption power, high image quality, etc., and thus are being widely used. The organic light emitting display devices, which use a self-emitting device self-emitting light and thus do not need a separate backlight, have a fast response time, high emission efficiency, high luminance, and a wide viewing angle. Therefore, the organic light emitting display devices are attracting much attention as next-generation FPD devices.

Generally, the display device includes a panel for displaying an image, a gate driver for sequentially supplying a scan pulse to a plurality of gate lines provided in the panel, a data driver for supplying data voltages to a plurality of data lines provided in the panel, and a timing controller for controlling the gate driver and the data driver.

The gate driver drives a plurality of switching elements included in each of a plurality of pixels in an active matrix type, thereby displaying a dynamic image. The gate driver may be configured as an integrated circuit (IC) type and may be mounted on a panel or a film or may be directly provided in the panel in a gate-in panel (GIP) type. The gate driver may be provided separately from the panel where the pixels of the display device are arranged, and may be electrically connected to the panel. For example, the gate driver may be provided on a separate board in a chip-on flexible (COF) type, a chip-on glass (COG) type, or other various types and may be electrically connected to the panel.

The gate driver is a shift register including a plurality of stages that sequentially output a scan signal to the gate lines provided in the panel in synchronization with a certain clock signal. The gate driver repeatedly performs an operation, where first to last stages sequentially output the scan signal according to the same period, at every frame.

DISCLOSURE

Technical Problem

The inventors of embodiments disclosed herein have recognized that in conventional gate drivers, an operation where first to last stages sequentially output a scan signal according to the same period causes an output of an unnecessary scan signal to waste consumption power, and moreover, except for an operation of displaying an image, additional functions such as touch sensing or fingerprint recognition are difficult to perform.

An aspect of the present invention is directed to provide a display device and a driving method thereof, which vary a scan signal output timing of each of some gate lines differently from a scan signal output timing of another gate line by using two or more independent external start signals, thereby solving the above-described problems and enabling a response to various driving environments.

Technical Solution

To achieve these and other advantages and in accordance with the purpose of the invention, as embodied and broadly described herein, there is provided a display device including a panel where a plurality of gate lines and a plurality of data lines are arranged, a data driver supplying data voltages to the plurality of data lines arranged in the panel, and a gate driver including a plurality of stage groups that are driven by independent external start signals to output scan signals.

In another aspect of the present invention, there is provided a display device including a panel and a gate driver including a plurality of stage groups for supplying a scan signal to a plurality of gate lines arranged in the panel, wherein independent start signals are supplied to the gate driver, each of the plurality of stage groups is supplied with and driven by at least one start signal, and during one frame period, at least one stage group of the plurality of stage groups is supplied with a start signal to output the scan signal, and a start signal is not supplied to other stage groups.

In another aspect of the present invention, there is provided a method of driving a display device including driving a kth stage group of a plurality of stage groups included in a gate driver by using a kth external start signal to output kth scan signals from a plurality of stages included in the kth stage group and outputting other scan signals from a plurality of stages included in another stage group by using another external start signal independent from the kth external start signal.

In another aspect of the present invention, there is provided a method of driving a display device including during one frame period, supplying an external start signal to at least one stage group of a plurality of stage groups included in a gate driver to output scan signals from a plurality of stages included in a stage group supplied with the external start signal, and stopping supplying of an external start signal to at least one stage group during the one frame period.

Advantageous Effect

According to some embodiments described herein, some areas of the display area of the panel may be driven or not. Also, some driving areas of the display area of the panel may operate at a driving speed which differs from that of another driving area. In the present invention, some driving areas may operate at a driving speed faster or slower than that of another driving area, based on an output image. Accordingly, the present invention can decrease the waste of consumption power is reduced in comparison with a conventional method where a whole display area always operates at the same driving speed.

Moreover, according to some embodiments described herein, a last stage in one of driving areas respectively driven by individual external start signals may operate, and then, in a period until before a first stage in a next driving area operates, touch sensing or other various operations may be performed.

In other words, according to the present invention, while one frame of an image is being displayed on the display area, the scan signal may not be output, and thus, a section where there is no noise may be more generated. Therefore, in addition to touch sensing, various operations which are easily performed when an output of the scan signal is stopped may be performed at a period shorter than a conventional period and may be performed a larger number of times than the conventional number of times, and thus, functions associated with the operations can be enhanced.

For example, according to some embodiments described herein, while an output of the scan signal is arbitrarily stopped and thus noise caused by the scan signal is reduced, whether the panel is touched may be determined, and whether there is a touch may be determined two or more times during one frame, thereby enhancing a touch sensitivity.

Moreover, according to the present invention, the external start signal, the stop signal, the reset signal, and the dummy stage may be configured in various types, and by variously varying an output of the scan signal, a display device which is driven based on various driving conditions without being limited to a specific driving condition may be manufactured.

DESCRIPTION OF DRAWINGS

FIG. 3 is a plan view of a display device to which a mutual-capacitive touch sensing function is applied.

FIG. 6 is an exemplary diagram showing waveforms of signals applied to the gate driver illustrated in FIG. 5.

FIG. 8 is an exemplary diagram illustrating a method of outputting a data voltage in a display device including the gate driver illustrated in FIG. 5.

FIG. 16A is an exemplary diagram illustrating an example of an SLC-based stage which is designed to reduce the number of external start signal lines.

MODE FOR INVENTION

Hereinafter, exemplary embodiments of the present invention will be described in detail with reference to the accompanying drawings.

In this disclosure below, embodiments will be described based on an LCD device, but are not limited thereto. For example, embodiments may be applied to all display devices, including a gate driver, such as organic light emitting display devices and the like.

Moreover, some embodiments will be described herein based on an in-cell type touch panel, but are not limited thereto. For example, some embodiments may be applied to an on-cell type touch panel, a hybrid type touch panel, and an add-on type touch panel, in addition to the in-cell type touch panel.

Figure 1:
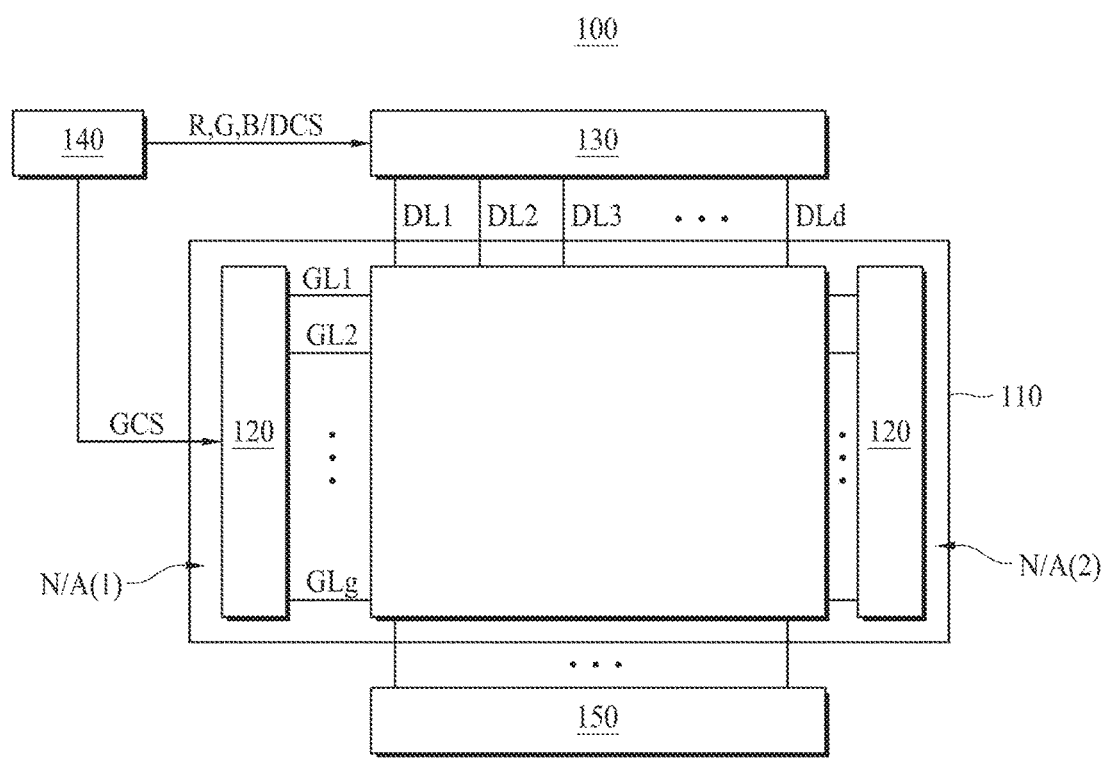
FIG. 1 is an exemplary diagram illustrating a configuration of a display device according to the present invention.

FIG. 1 is an exemplary diagram illustrating a configuration of a display device according to an embodiment of the present invention. Referring to FIG. 1, a display device 100 includes a panel 110 that includes a display area A/A, where a plurality of pixels P are provided and display an image, and a non-display area N/A disposed outside the display area A/A. Also, the display device 100 includes a gate driver 120, which outputs a scan signal to the plurality of pixels P through a plurality of gate lines GL1 to GLg, and a data driver 130 that supplies data voltages to the plurality of pixels P through a plurality of data lines DL1 to DLd. The gate driver 120 and the data driver 130 may be included in the panel 110. Furthermore, signals for controlling the gate driver 120 and the data driver 130 may be supplied from a timing controller 140.

The display device 100 according to an embodiment of the present invention may include a touch sensing function or not. If the display device 100 includes the touch sensing function, a plurality of touch electrodes may be included in the panel 110, and the display device 100 includes a touch driver 150 that supplies a touch voltage to the touch electrodes to determine whether there is a touch. If the display device 100 does not include the touch sensing function, the touch electrodes and the touch driver 150 may be omitted.

The panel 110 performs a function of displaying an image. The panel 110 may be changed depending on the kind of the display device 100, and particularly, if the display device 100 is an LCD device, the panel 110 may be a liquid crystal panel where a liquid crystal layer is provided between two substrates. In this case, the plurality of data lines DL1 to DLd, the plurality of gate lines GL1 to GLg, and a plurality of thin film transistors (TFTs) electrically connected to the data lines DL1 to DLd and the gate lines GL1 to GLg to drive the pixels P are included in one of the substrates configuring the liquid crystal panel. The panel 110 includes a plurality of pixel electrodes (not shown) for charging data voltages and a common electrode for driving liquid crystal filled into the liquid crystal layer along with the pixel electrodes. In the panel 110, the pixels P are disposed in a matrix type, and a black matrix BM and a color filter are disposed depending on a structure of the pixels.

As described above, the panel 110 may be configured with an organic light emitting panel. In this case, each of the pixels included in the panel 110 may include an organic light emitting diode (OLED), a plurality of TFTs that are connected to a corresponding data lines DL and a corresponding gate lines GL to control the OLED, and a storage capacitor. As described above, some embodiments described in the present specification may be applied to various kinds of panels in addition to a liquid crystal panel and an organic light emitting panel.

The gate driver 120 supplies the scan signal to the gate lines by using a plurality of gate control signals GCS transferred from the timing controller 140. In the present specification, the scan signal denotes a signal for turning on a switching TFT connected to a corresponding gate line. Also, a signal for turning off the switching TFT is referred to as a gate-off signal. A generic name for the scan signal and the gate-off signal is a gate signal. If the switching TFT is an N type, the scan signal is a high-level voltage, and the gate-off signal is a low-level voltage. On the other hand, if the switching TFT is a P type, the scan signal is a low-level voltage, and the gate-off signal is a high-level voltage.

The gate driver 120 may be provided independently from the panel 110 and may be connected to the panel 110 through a tape carrier package (TCP), a flexible printed circuit board (FPCB), or the like. In the present specification, however, it is described that the gate driver 120 is provided in a GIP type where the gate driver 120 is mounted in at least one non-display area N/A of the panel 110, and an output terminal of the gate driver 120 is electrically connected to the plurality of gate lines provided in the display area A/A. The gate driver 120 is disposed on one side of the panel 110, or as illustrated in FIG. 1, the gate driver is disposed on both sides of the panel 110. In this case, the gate drivers 120 may be configured as an interlace type where one gate driver 120 applies the scan signal to pixels corresponding to odd lines, and another gate driver 120 applies the scan signal to pixels corresponding to even lines. Also, in some embodiments, the one gate driver 120 may apply the scan signal to pixels disposed in one area of the panel 110, and the other gate driver 120 may apply the scan signal to pixels disposed in another area of the panel 110.

In embodiments described herein, the gate driver 120 may include a stage group, which starts to be driven by a first external start signal, and N number of stage groups which start to be driven by other external start signals. Each of the stage groups includes a plurality of stages, and the stages included in each stage group sequentially output the scan signal to a specific area of the display area. To provide a more detailed description, a plurality of pixels arranged in a first driving area are driven according to the scan signal output from the stages of the first stage group, and a plurality of pixels arranged in a second driving area are driven according to the scan signal output from the stages of the second stage group.

The data driver 130 converts digital image data, transferred from the timing controller 140, into analog data voltages by using a reference voltage and supplies the analog data voltages for one horizontal line to the data lines at every one horizontal period where the scan signal is supplied to the gate line. The data driver 130 may be connected to the panel 110 in a chip-on film (COF) type, may be directly equipped in the panel 110, or may be configured as thin film transistors (TFTs) in the panel 110.

The gate driver 120 or data driver 130 may be provided as one IC along with the timing controller 140.

The timing controller 140 transfers a data control signal DCS for controlling the data driver 130 and a gate control signal GCS for controlling the gate driver 120 by using a plurality of timing control signals (e.g., a vertical synchronization signal Vsync, a horizontal synchronization signal Hsync, a data enable signal DE, etc.) and transfers image data to the data driver 130. Also, the timing controller 140 may supply a clock CLK for driving the gate driver 120.

The gate control signal GCS may include a gate start pulse GSP, a gate shift clock GSC, a gate output enable signal GOE, a gate clock GCLK, etc. The data control signal DCS may include a source start pulse SSP, a source shift clock signal SSC, a source output enable signal SOE, etc.

Moreover, the timing controller 140 may transfer a plurality of reset signals and a plurality of external start signals, which allow the display area to be divided into a plurality of driving areas and driven, to the gate driver 120. If a touch sensing function is added to the panel 110, a touch control signal for controlling the touch driver 150 may also be transferred from the timing controller 140 to the panel 110.

The timing controller 140 may perform a function that realigns input video data received from an external system (not shown) so as to match a structure according to embodiments of the present invention and transfers image data generated through the alignment to the data driver 130, in addition to the above-described function of generating the control signals. For example, the timing controller 140 may disallow the data voltages to be output to the data lines until the scan signal is sequentially output to gate lines corresponding to a first driving area by a first external start signal and then starts to be output to gate lines corresponding to a second driving area by a second external start signal, and the timing controller 140 may realign the input video data to generate the image data and then may transfer the image data to the data driver 130 according to a timing when the scan signal is output to the gate lines corresponding to the second driving area.

In a driving area where the scan signal is not output to the gate lines, even when new data voltages are applied to data lines, pixels cannot be driven by the new data voltages. Therefore, data voltages may be output to the data lines irrespective of whether the scan signal is applied to a specific driving area. However, in some embodiments, the timing controller 140 may transfer only image data, corresponding to some driving areas to which the scan signal is supplied, to the data driver 130.

As described above, the panel 110 may be configured in various structures such as an in-cell type, an on-cell type, a hybrid type, an add-on type, etc.

In the present specification, for convenience of description, a panel to which the in-cell type is applied is described as an example of the present invention. Unlike the add-on type which uses touch electrodes included in a separate touch panel, in the in-cell type, touch electrodes for sensing a touch is directly included in the panel 110. For example, in an in-cell type panel, a common electrode is used as a touch electrode. An in-cell type touch panel may be configured based on a self-capacitance type or a mutual-capacitance type.

Figure 2:
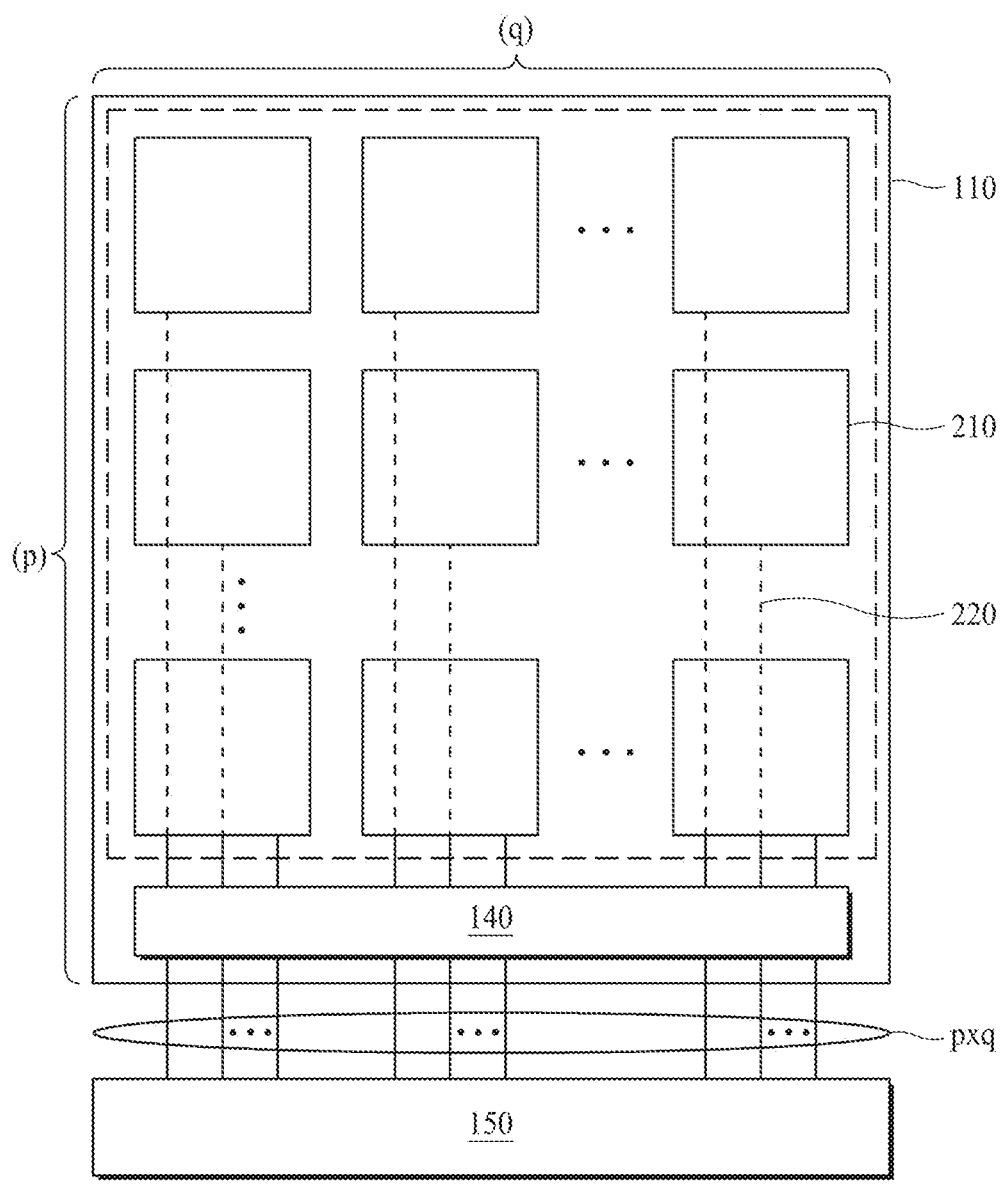
FIG. 2 is a plan view of a display device to which a self-capacitive touch sensing function is applied.

FIG. 2 is a plan view of a display device to which a self-capacitive touch sensing function is applied, and FIG. 3 is a plan view of a display device to which a mutual-capacitive touch sensing function is applied.

If the display device 100 includes a liquid crystal panel, common electrodes for generating an electric field along with pixel electrodes to drive liquid crystal may act as touch electrodes 210.

The number of touch electrode lines (TL1 to TL(pxq)) 220 corresponds to a multiplication of the number "q" of touch electrodes 210 which are disposed in a horizontal direction of the panel 110 and the number "p" of touch electrodes 210 which are disposed in a vertical direction of the panel 110. A plurality of the touch electrodes 210 may be respectively provided in a plurality of pixels provided in the panel 110. As illustrated in FIG. 2, each of the touch electrodes 210 may be connected to the touch driver 150 through a corresponding touch electrode line 220 to act as a driving electrode and a receiving electrode. In order to solve problems which occur because each of the touch electrode lines 220 are disposed far closer to a pixel electrode or a common electrode, the touch electrode lines 220 may be disposed inside a planarization layer that covers TFTs for driving the pixels. Alternatively, the touch electrode lines 220 may be disposed under the TFTs, the pixel electrode and the common electrode may be disposed over a corresponding TFT, and the touch electrode lines 220 may be connected to the touch electrodes 210 through a contact hole. If each of the touch electrode lines 220 is disposed on a side opposite to the pixel electrode and the touch electrode with a layer, including the TFT, therebetween, the planarization layer may be disposed on and under the layer on which the TFT is provided. Here, the planarization layer which is formed before the TFTs are formed may be formed of a material for minimizing a defect caused by a process of forming the TFTs. In a structure where the touch electrode lines 220 are formed in an upper portion of the panel 110 and the TFTs are formed on the touch electrode lines 220, the planarization layer between each of the touch electrode lines 220 and a TFT layer may be formed of silicon-based SOG.

In a case of using the mutual-capacitance type, as illustrated in FIG. 3, the touch panel may be configured with a plurality of driving electrodes TX1 to TXk and a plurality of receiving electrodes RX1 to RXs. In an image display period, a common voltage is supplied to the driving electrodes and the receiving electrodes, and thus, the panel 110 displays an image. In a touch sensing period, a touch voltage may be sequentially supplied to the driving electrodes, and whether the panel 110 is touched may be determined based on sensing signals received from the receiving electrodes.

The touch driver 150 may be independently provided as illustrated in FIGS. 2 and 3, or may be integrated into the timing controller 140 or the data driver 130.

Figure 4A:
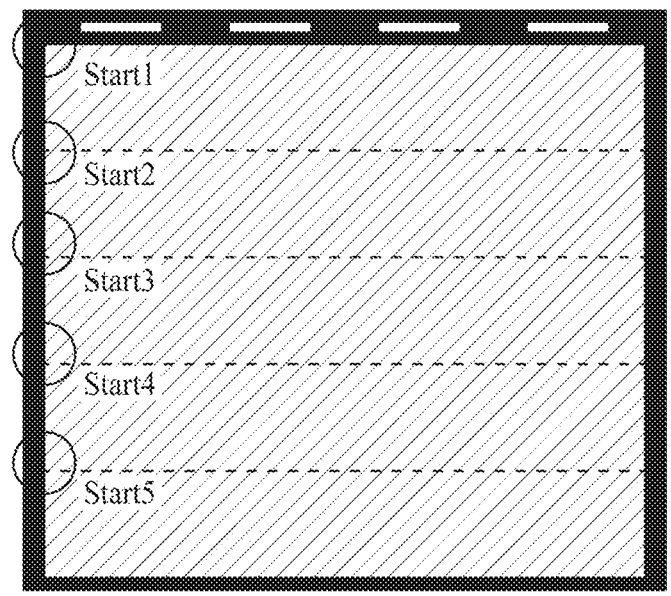
FIGS. 4A and 4B are exemplary diagrams for describing a method of driving a display device according to the present invention.
Figure 4B:
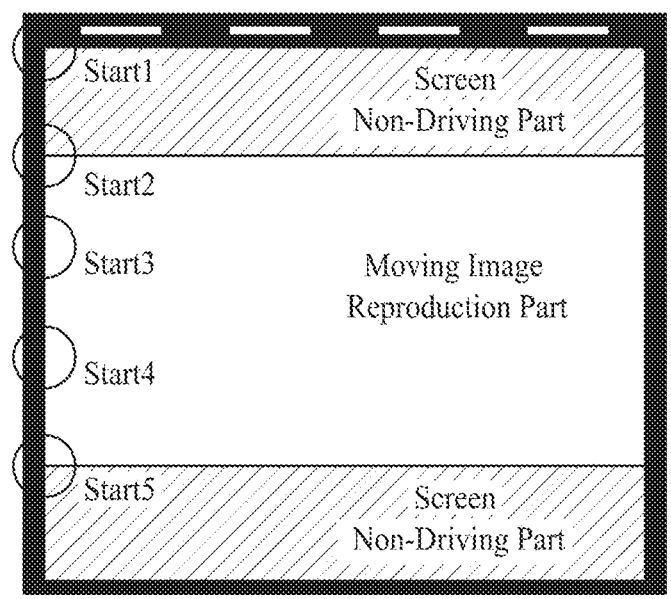

FIGS. 4A and 4B are exemplary diagrams for describing a method of driving a display device according to an embodiment of the present invention. FIGS. 4A and 4B are exemplary diagrams for describing a method of driving the display device 100 according to some embodiments of the present invention. The display device 100 according to an embodiment of the present invention may divide the display area of the panel 110 into a plurality of driving areas and may individually drive the plurality of driving areas (or division areas). In FIGS. 4A and 4B, the display area is illustrated as being divided into five driving areas, but the number of the driving areas may be smaller or larger without being limited thereto. Also, a size of the driving areas may be small or largely implemented depending on a configuration of each of the stage groups.

The gate driver 120 applied to the display device according to an embodiment of the present invention is configured to individually drive the plurality of driving areas. In order to drive the panel 110 for each of the driving areas, the gate driver 120 includes stage groups equal to the number of the driving areas. In other words, the gate driver 120 includes stage groups corresponding to the divided driving areas. In order to individually drive each of the driving areas, a first stage of each of the stage groups uses an external start signal applied through an external start signal line without using an output of a stage of another stage group as a start signal.

In the present invention, in addition to the external start signal line through which a basic external start signal Start1 for starting driving of an uppermost stage of the gate driver 120 is applied, a separate external start signal line through which the external start signal is applied to each of the driving areas is provided, thereby enabling the display area to be divisionally driven. As illustrated in FIGS. 4A and 4B, if the display area of the panel 110 is divided into a total of five driving areas, in addition to the external start signal line through which the basic external start signal Start1 is supplied, a total of four external start signal lines Start2 to Start5 are added.

The display area of the panel 110 may be divided into a various number of driving areas, and sizes of the driving areas may be the same or may differ. A stage which operates according to the external start signals Start2 to Start5 and a reset signal may be provided as one or more in each of the driving areas. As the number of the driving areas increases, the external start signal line may be added.

In the present embodiment, the driving areas may be driven in various methods in addition to the method illustrated in FIG. 4B.

For example, in FIG. 4B, a moving image may be reproduced through second to fourth driving areas, but a position of a driving area at which a moving image is reproduced may be variously changed.

Figure 5:
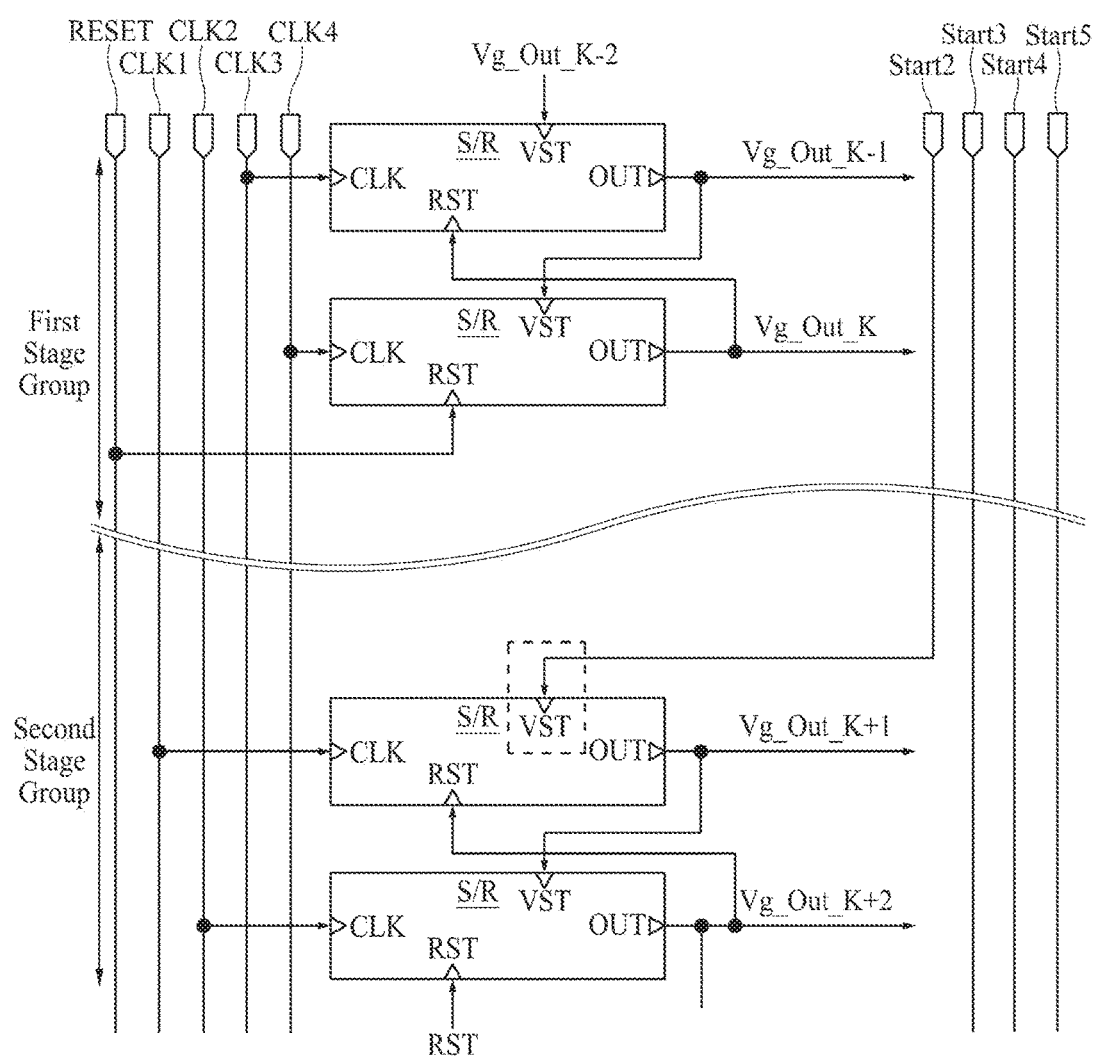
FIG. 5 is an exemplary diagram illustrating a configuration of a gate driver for implementing the above-described driving method.
Figure 7:
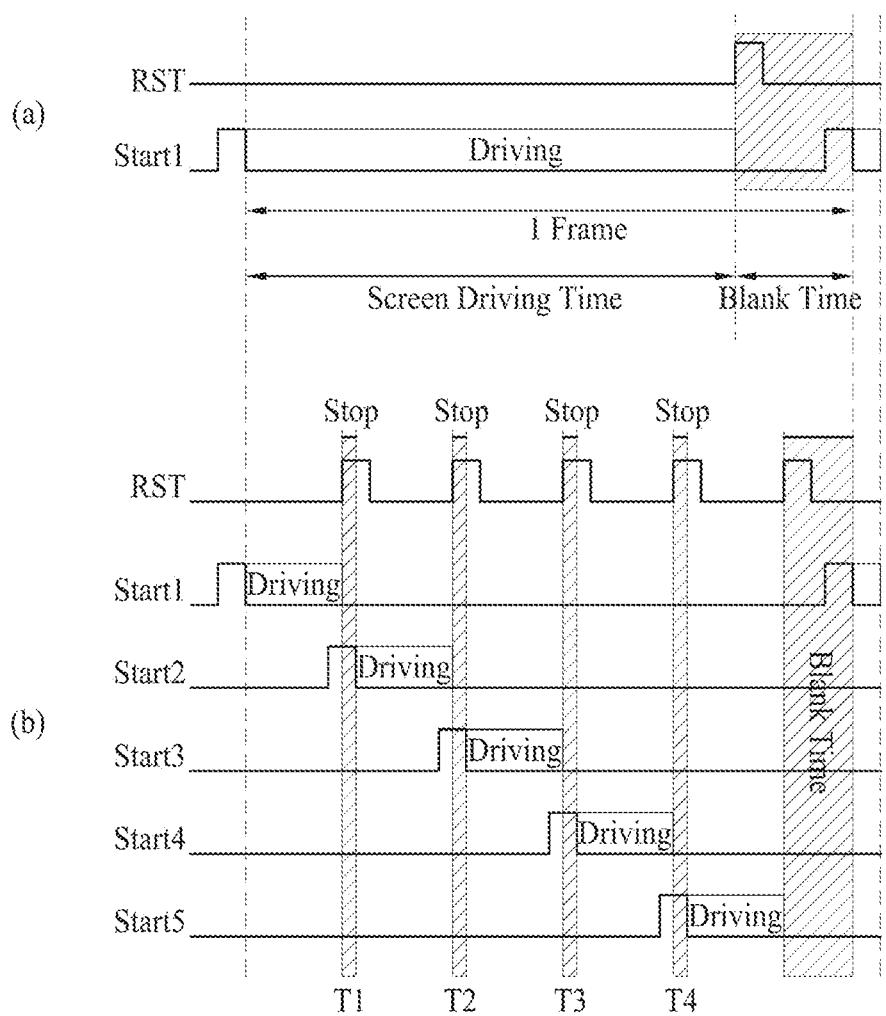
FIG. 7 is an exemplary diagram illustrating a method of determining a touch in a display device including the gate driver illustrated in FIG. 5.

FIG. 5 is an exemplary diagram illustrating a configuration of a gate driver for implementing the driving method. FIG. 6 is an exemplary diagram showing waveforms of signals applied to the gate driver illustrated in FIG. 5. FIG. 7 is an exemplary diagram illustrating a method of determining a touch in a display device including the gate driver illustrated in FIG. 5. FIG. 8 is an exemplary diagram illustrating a method of outputting a data voltage in a display device including the gate driver illustrated in FIG. 5.

When a first stage group corresponds to a driving area disposed in an uppermost end of a display area, the first stage group starts to be driven by the basic external start signal Start1. Each of the external start signals is supplied to a VST terminal of a first stage, disposed in an area where a screen is divided, among a plurality of stages included in each of first to fifth stage groups. In each stage group, stages other than a stage which receives the external start signal through the external start signal line may receive a scan signal, which is output from another stage of a stage group including the stages, as a start signal and may receive a scan signal as the reset signal from a stage disposed in a rear end, whereby the stages may be driven.

To provide a description with reference to FIG. 5, a scan signal output from a K−2 stage is applied as a start signal to a VST terminal of a K−1 stage, and a scan signal output from the K−1 stage is input to a reset terminal RST of the K−2 stage to reset the K−2 stage. In other words, stages other than a stage driven by the external start signal supplied thereto among the stages of the first stage group are supplied with an output of a stage, driven prior to each of the stages, through the VST terminal and driven according to the supplied output. Therefore, the scan signal is sequentially output from the stages of the first stage group.

However, an output of a K stage included in the first stage group is not applied as a start signal of a K+1 stage included in the second stage group. Therefore, the second stage group does not start to drive until the external start signal is applied through a separate external start signal line. In this case, the scan signal is not output from the K+1 stage, and thus, the K stage which is a last stage of the first stage group is reset by an external reset signal applied through an external reset signal line. That is, each stage group includes one or more stages, which are driven by the external start signal supplied through the external start signal line, and one or more stages which are reset by the external reset signal supplied through the external reset signal line.

When a second external start signal is input to the second stage group, an output of a stage which is supplied with the second external start signal and is driven by the second external start signal is supplied to a VST terminal of another stage of the second stag group, and thus, stages of the second stage group are sequentially driven. Other stage groups of the gate driver 120 are also provided in an independent structure like the first stage group and the second stage group.

For divisional driving, each stage group receives a start signal through an independent start signal line. However, the external reset signal supplied to the stage groups is applied through the external reset signal line shared by the stage groups.

If the gate driver 120 is configured as illustrated in FIG. 5, the display device may be driven by waveforms shown in FIG. 6. FIG. 6 (a) shows waveforms of the external start signals and the external reset signal when first to fifth driving areas are all driven by the external start signals, and all driving areas of the panel may be sequentially driven by the waveforms shown in FIG. 6 (a).

To provide a detailed description, when first to fifth external start signals Start 1 to Start 5 are sequentially supplied to the first to fifth stage groups during one frame period, the scan signal is sequentially output to the gate lines provided in all of five driving areas. That is, if divisional driving of a screen is not needed, as in FIG. 6 (a), by adjusting a timing when the external start signal is applied to each stage group, all the stages of the gate driver may be driven like being driven by one external start signal. In other words, a timing when the external start signal is applied to each stage group may be adjusted so that an output of a previous stage is the same as being sequentially input as a start signal, and thus, the display area may be wholly driven. Therefore, pixels provided in all the driving areas are charged with data applied through data lines.

FIG. 6 (b) shows waveforms of the external start signals and the external reset signal when only stage groups corresponding to a driving area including pixels which are to be charged with new data voltages are driven, and other stage groups are not driven. As shown in FIG. 6 (b), during one frame period, when the external start signal is supplied to the second to fourth stage groups without being supplied to the first stage group and the fifth stage group, only the second to fourth driving areas may be driven as shown in FIG. 4B. Therefore, an image may be displayed through only the second to fourth driving areas. That is, a driving area displaying an image may be variously changed by supplying the external start signal to only some stage groups.

When a driving area where a fast image output is unnecessary is driven at a speed lower than that of another driving area, consumption power of the panel 110 is reduced. For example, in five driving areas shown in FIG. 4B, three driving areas on which an image is displayed may be driven at a speed such as 15 Hz, 30 Hz, 60 Hz, 120 Hz, or 240 Hz, and other two driving areas on which an image is not displayed may be driven at a speed lower than those of the three driving areas. That is, stages of the first stage group provided in the first driving area and stages of the fifth stage group provided in the fifth driving area may be driven at a frequency lower than those of stages of the second to fourth stage groups provided in the second to fourth driving areas. As a result, frequencies of the scan signals output to the first driving area and the fifth driving area may become lower than the other driving areas. In the first driving area and the fifth driving area, pixels to which the scan signal is not output cannot be charged with new data voltages.

However, second to fourth external start signals Start2 to Start4 may be sequentially supplied to the second to fourth stage groups provided in the second to fourth driving areas according to a predetermined timing, and thus, the scan signal may be output to gate lines disposed in the second to fourth driving areas. Therefore, an image may be normally displayed on the second to fourth driving areas. In this manner, when only the second to fourth driving areas are driven in one the panel 110, only about 60% of the stages of the gate driver 120 may be driven, and thus, about 40% stages may not be driven at an unnecessarily fast speed, thereby decreasing power consumption.

An output waveform of the scan signal among various signals applied to the display device is wider in voltage range than the other signals. Therefore, when the scan signal is output, coupling occurs due to a parasitic capacitance. The coupling and other noises caused by an output of the scan signal decreases a touch sensing rate or a fingerprint recognition rate in the display device. In the related art, as shown in FIG. 7 (a), a method of sensing a touch for a blank time between frames where there is no noise caused by the scan signal is used. In this case, an operation of determining whether there is a touch is performed only once for each frame. However, according to the above-described embodiment of the present invention, as shown in FIG. 7 (b), the operation of determining whether there is a touch may be performed in a blank time and periods T1 to T4 where the scan signal is not output.

For example, as shown in FIGS. 4A and 4B, if the panel 110 is divided into the five driving areas and driven, stage groups respectively corresponding to the driving areas are individually driven by different external start signals. Therefore, an operation of determining whether there is a touch may be performed during a period until the scan signal is output to stages of one stage group and then the scan signal is output to stages of a next stage group. In other words, in one frame, a touch sensing operation may be performed in a period where an output of the scan signal is stopped, according to a timing when the external start signal is applied.

If the gate driver 120 is configured with five stage groups, a period where an output of the scan signal is stopped may be generated from one frame to a next frame a total of five times (T1 to T4 and the blank time). That is, the touch sensing operation may be performed a plurality of times in one frame period, and thus, a touch sensing sensitivity is enhanced.

A length of a period where an output of the scan signal is stopped may be variously changed according to a timing when each of the external start signals is input to a corresponding stage group. Also, in addition to sensing of a touch input, operations where are easily performed in a period where there is no output of the scan signal may be performed in a period where an output of the scan signal is stopped.

FIG. 8 shows a data timing when a data signal is applied to a data line, in a case where the stage groups of the gate driver 120 are driven by using independent external start signals. Pixels in a driving area where the scan signal is not output to gate lines cannot operate with new data voltages even when the new data voltages are supplied to the pixels through the data lines. Therefore, the display area may be divided and driven only by controlling the scan signals of the stage groups included in the gate driver 120. Accordingly, in some embodiments, as shown in FIG. 8 (a), the data driver 130 may output data voltages without participating in an output of the scan signal to gate lines disposed in a specific driving area.

In some embodiments, as shown in FIG. 8 (b), the data driver 130 may be configured to output only data voltages corresponding to a driving area(s) which should receive the scan signal to receive new data voltages. To this end, the timing controller 140 may hold the image data and then may transfer the held image data to the data driver 130. The timing controller 140 may realign the input video data received from the external system according to whether the stage groups are driven, and may transfer the image data generated through the realignment to the data driver 130.

The control of the data timing may be performed through an operation where image data are stored in a memory such as a field-programmable gate array during a stop period where the scan signal is not output, and when the gate driver 120 operates again, the image data are read from the memory. To this end, the timing controller 140 and the gate driver 120 should be synchronized with each other.

Hereinabove, the details described above with reference to FIGS. 6 to 8 may be identically applied to various embodiments of the present invention to be described below, in addition to the preceding embodiments.

Figure 9:
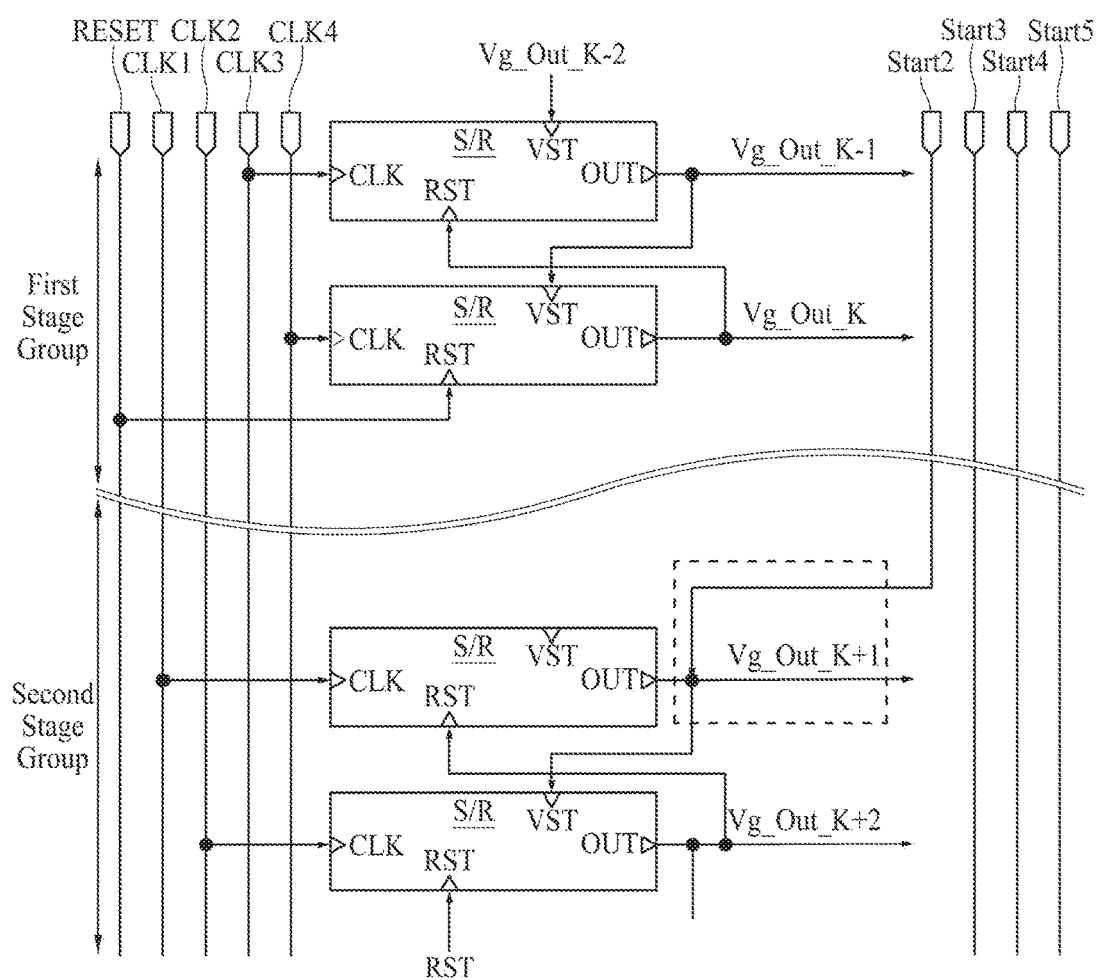
FIG. 9 is an exemplary diagram illustrating a configuration of another gate driver of a display device which divides a display area into a plurality of driving areas and drives the driving areas.

FIG. 9 is an exemplary diagram illustrating a configuration of another gate driver of a display device which divides a display area into a plurality of driving areas and drives the driving areas. In FIG. 9, for convenience of description, only some stages provided in a boundary portion between the first driving area and the second driving area among the stages of the gate driver 120 are illustrated.

In the gate driver 120 illustrated in FIG. 5, the external start signals are used to start driving of first stages of the respective stage groups. In this case, a timing when the external start signal is applied is determined based on a time when a stage is driven by the external start signal to output the scan signal. In order to more easily start driving of a stage group, the external start signal may be directly supplied to an output terminal of a stage connected to a first gate line in a divided driving area. In other words, a second external start signal line is connected to an output terminal of a first stage of a second stage group among two adjacent stage groups.

Referring to FIG. 9, the second external start signal Start2 is directly output as a scan signal through a gate line connected to a first stage (Stage K+1) of stages included in the second stage group. The output scan signal is applied as a start signal for another stage (Stage K+2) of the second stage group. As a result, the external start signal may be input as the scan signal for the first stage of the second stage group and may also be input as the start signal for the second stage. In this case, a timing when each of the stage groups operates is more conveniently controlled.

Figure 10:
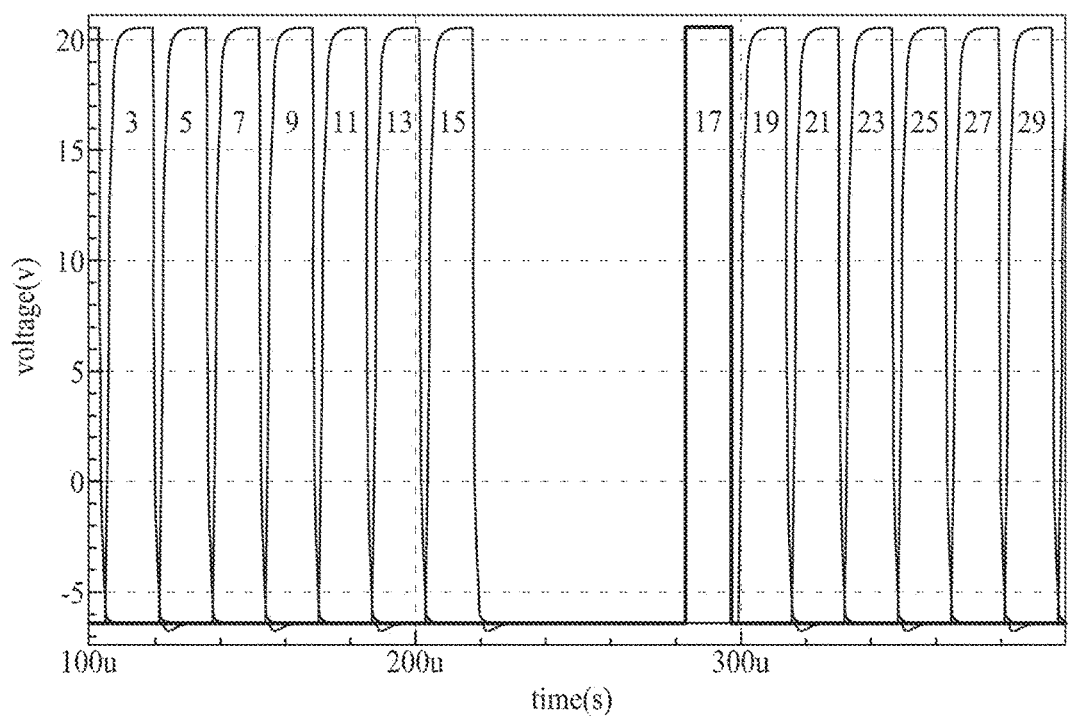
FIG. 10 is an exemplary diagram showing waveforms of scan signals output from the gate driver of FIG. 9.
Figure 11:
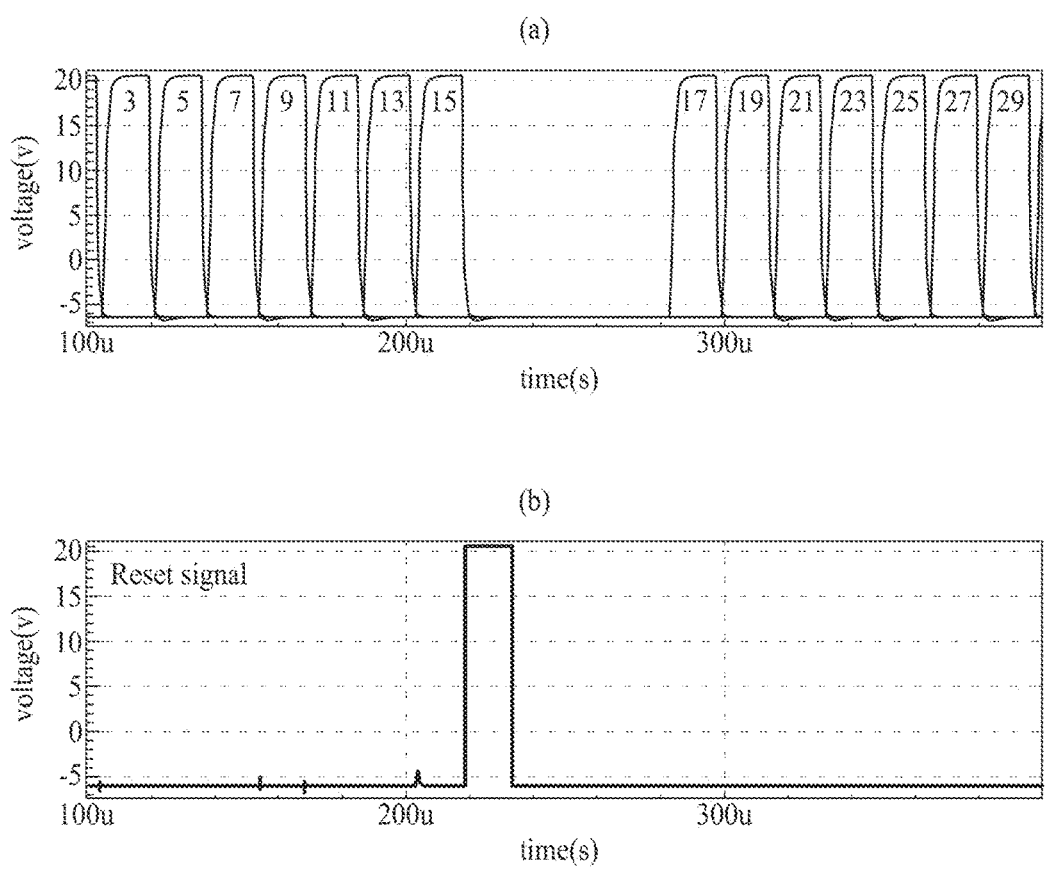
FIG. 11 is an exemplary diagram showing a waveform of a reset signal used by the gate driver of FIG. 9.

FIG. 10 is an exemplary diagram showing waveforms of scan signals output from the gate driver of FIG. 9, and FIG. 11 is an exemplary diagram showing a waveform of a reset signal used by the gate driver of FIG. 9. In a case where the external start signal is directly supplied to an output terminal of a stage, the scan signal of the stage may have a waveform different from those of the scan signals of other stages. Also, in each of the stage groups, the scan signal output from each stage is applied as a reset signal to other stages. However, as in structures illustrated in FIGS. 5 and 9, a waveform of an external reset signal directly applied through an external reset signal line may differ from that of a reset signal (a scan signal) applied from other stages. Each of the stage groups may further include a dummy stage in order for waveforms of scan signals and reset signals to be constant.

Figure 12:
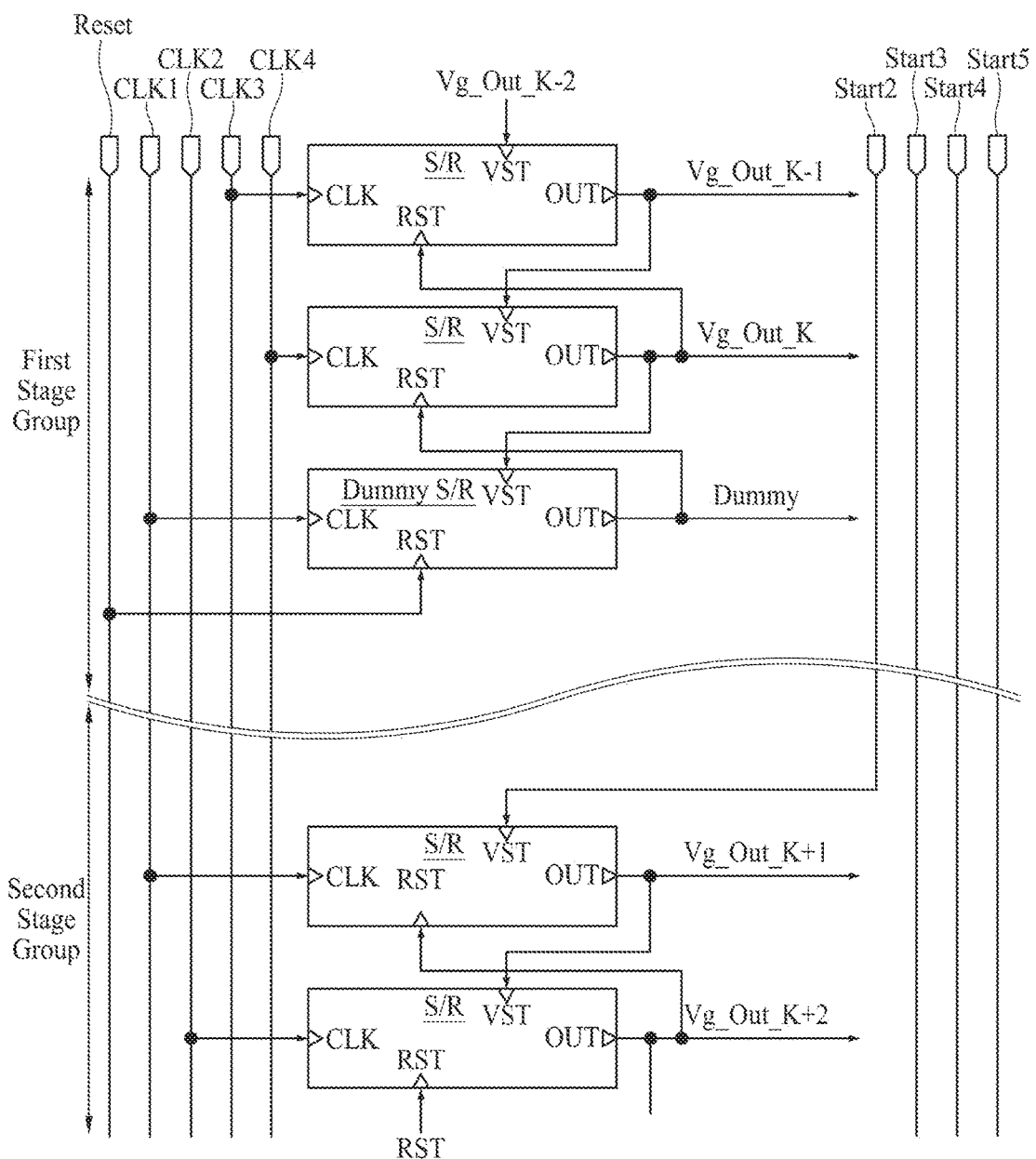
FIG. 12 is an exemplary diagram illustrating a configuration of a gate driver including a dummy stage added into stage groups.
Figure 13:
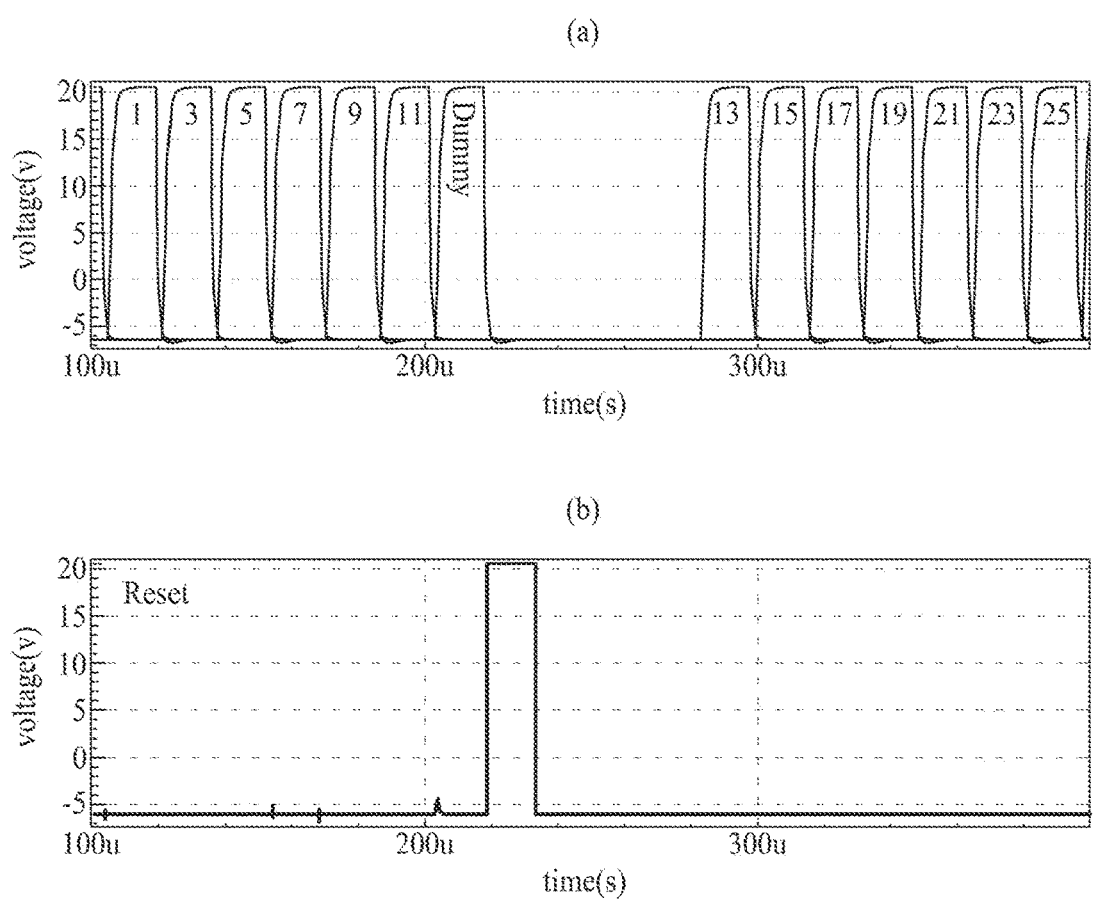
FIG. 13 is an exemplary diagram showing waveforms of scan signals output from stages in a gate driver including a dummy stage added into stage groups.
Figure 14:
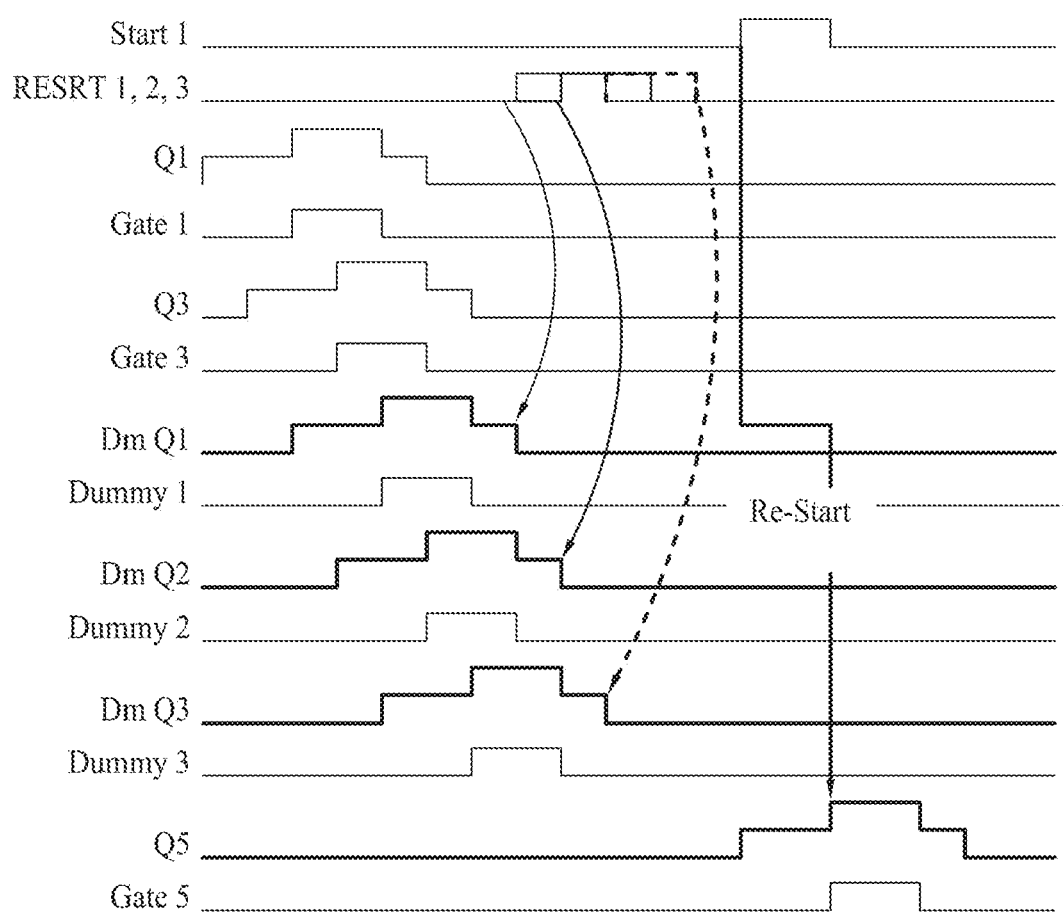
FIG. 14 is a timing diagram of each of signals applied to the present invention.

FIG. 12 is an exemplary diagram illustrating a configuration of a gate driver including a dummy stage added into stage groups. FIG. 13 is an exemplary diagram showing waveforms of scan signals output from stages in a gate driver including a dummy stage added into stage groups. FIG. 14 is a timing diagram of each of signals applied to an embodiment of the present invention.

Referring to FIG. 12, in each stage group, a stage which receives an external reset signal through an external reset signal line is configured as a dummy stage that does not output a scan signal to a gate line. An output of the dummy stage is not applied as the scan signal to the gate line, but is supplied as a reset signal for a stage previous to the dummy stage. Therefore, all stages that output the scan signal may be reset by a reset signal having the same form.

To provide an additional description, as shown in FIG. 13 (b), a form of the external reset signal input to the dummy stage differs from a waveform of each of scan signals which are input as the reset signal. However, since the dummy stage does not output the scan signal, the dummy stage is irrelevant to a case where an image is displayed even when the external reset signal having a different waveform is applied. Also, a stage which receives an output of the dummy stage as a reset signal is supplied with a reset signal having a waveform similar to other stages.

In FIG. 12, a gate driver where one dummy stage is included in each stage group is illustrated. However, the number of dummy stages included in each stage group is not limited thereto and may further increase depending on the case.

For example, if three dummy stages are included in each stage group, each stage group may operate like signals corresponding to a timing shown in FIG. 14.

Figure 15A:
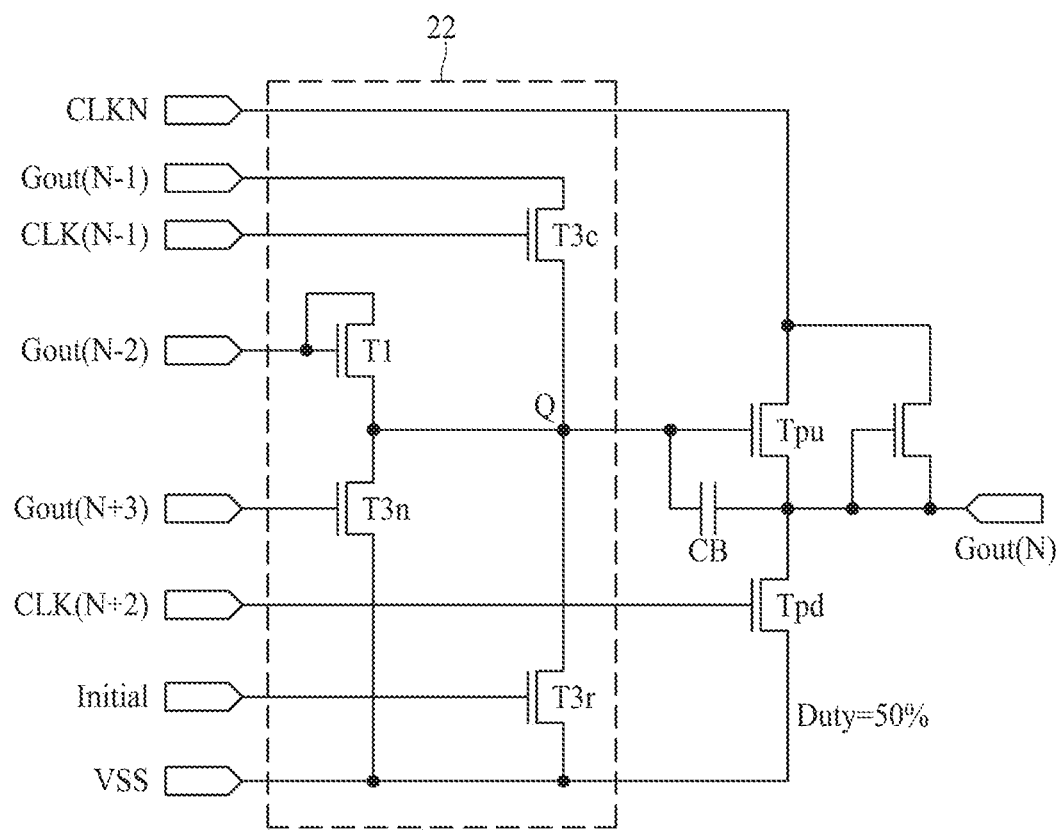
FIG. 15A is an exemplary diagram illustrating an example of a stage having a simple logic circuit structure.
Figure 15B:
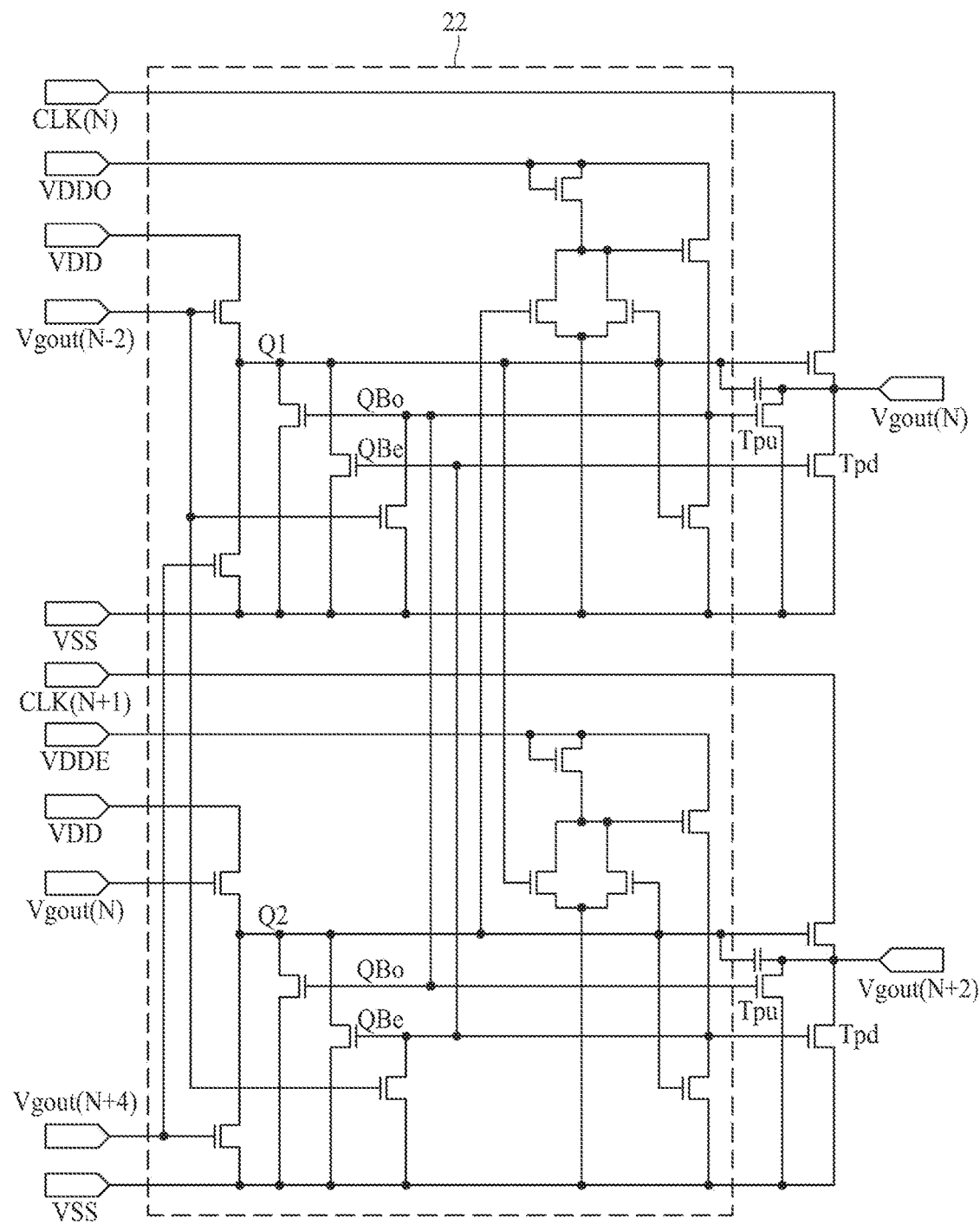
FIG. 15B is an exemplary diagram illustrating an example of a stage having a half dual pull-down AC structure.

The gate driver described herein may be configured with a plurality of simple logic circuit (SLC)-based stages or a plurality of half dual pull-down AC (HDAC)-based stages. FIG. 15A is an exemplary diagram illustrating an example of a stage having an SLC structure capable of being applied to the gate driver described herein, and FIG. 15B is an exemplary diagram illustrating an example of a stage having an HADC structure.

First, the SLC-based stage will be briefly described below with reference to FIG. 15A. In the SLC-based stage, a separate QB-node is not provided. The QB-node is a node for controlling an output of the gate-off signal.

The SLC-based stage may be configured with, for example, seven TFTs and one capacitor CB. In the SLC-based stage, a layout is simplified, and an area of a bezel is reduced. Particularly, due to the capacitor CB, a coupling voltage is reduced, a bootstrap voltage increases, and the voltage holding characteristic of a Q node is enhanced. In the SLC-based stage, the capacitor CB may be provided for securing a margin of a threshold voltage (Vth), thereby enhancing reliability.

The stage having the SLC structure may start to be driven by two start signals. For example, in the SLC structure of FIG. 15A, the stage starts to be driven in response to a start signal applied through a GOUT(N−1) terminal and a start signal applied through a GOUT(N−2) terminal. Therefore, if the gate driver is configured with the SLC-based stages, an external start signal may be applied to each of a plurality of stage groups through two external start signal lines, for implementing the above-described methods of driving the gate driver. For example, each of external start signal lines (for example, Start1 to Start5) may be configured with two signal lines.

Next, the HDAC-based stage will be briefly described below with reference to FIG. 15B. The HDAC-based stage includes two QB-nodes, and moreover, may include two power sources for alternately driving the QB-nodes. In the HDAC-based stage, a pull-down TFT is repeatedly deteriorated and recovered, and thus, reliability of a circuit is enhanced.

Particularly, in the gate driver including the HDAC-based stages, two adjacent stages share the QB-nodes. Therefore, the number of TFTs and a size of a circuit are reduced. In the HDAC-based stage, stability of the circuit is enhanced, and reliability of the circuit is enhanced.

Unlike the SLC-based stage, the HDAC-based stage starts to be driven by one external start signal. Referring to FIG. 15B, for example, a start signal may be applied to a Vgout(N−2) terminal and a Vgout(N) terminal to start driving of the stage.

In implementing the above-described driving methods, if a gate driver is configured with SLC-based stages, the number of external start signals needs two times the number of external start signals applied to a gate driver including HDAC-based stages. For example, in the SLC structure, if a screen is divided into five driving areas and driven, ten external start signals may be provided.

FIG. 16A is an exemplary diagram illustrating an example of an SLC-based stage which is designed to reduce the number of external start signal lines necessary for implementing the driving methods described herein. Referring to FIG. 16A, terminals separately receiving a start signal in FIG. 15A are connected to each other, and thus, a stage receives an external start signal through one external start signal line.

Waveforms shown in FIG. 16A (b) may be input/output to/from the stage shown in FIG. 16A (a). To provide an additional description, a conventional SLC structure needs two start signals. However, in order to drive the SLC-based stage by using only one start signal, as shown in FIG. 16A (a), the stage may be configured in order for a signal to be input to a gate of a T1 transistor and a source of a T3c transistor in common, and thus, as shown in FIG. 16A (b), a width of the start signal is enlarged.

Even in the SLC-based stage having a structure different from the structure of FIG. 15A, a plurality of external start signal input terminals may be connected to each other, thereby decreasing the number of start signal lines for divisional driving.

As described above, in order to reduce the number of external start signal lines connected to the SLC-based stage, a stage which is supplied with an external start signal may be configured as shown in FIG. 16A, and stages which are not supplied with the external start signal may be configured as shown in FIG. 15A.

Therefore, a stage to which the external start signal is input and a stage to which the external start signal is not input may be configured as different types, and thus, may output different waveforms of scan signals.

Figure 16B:
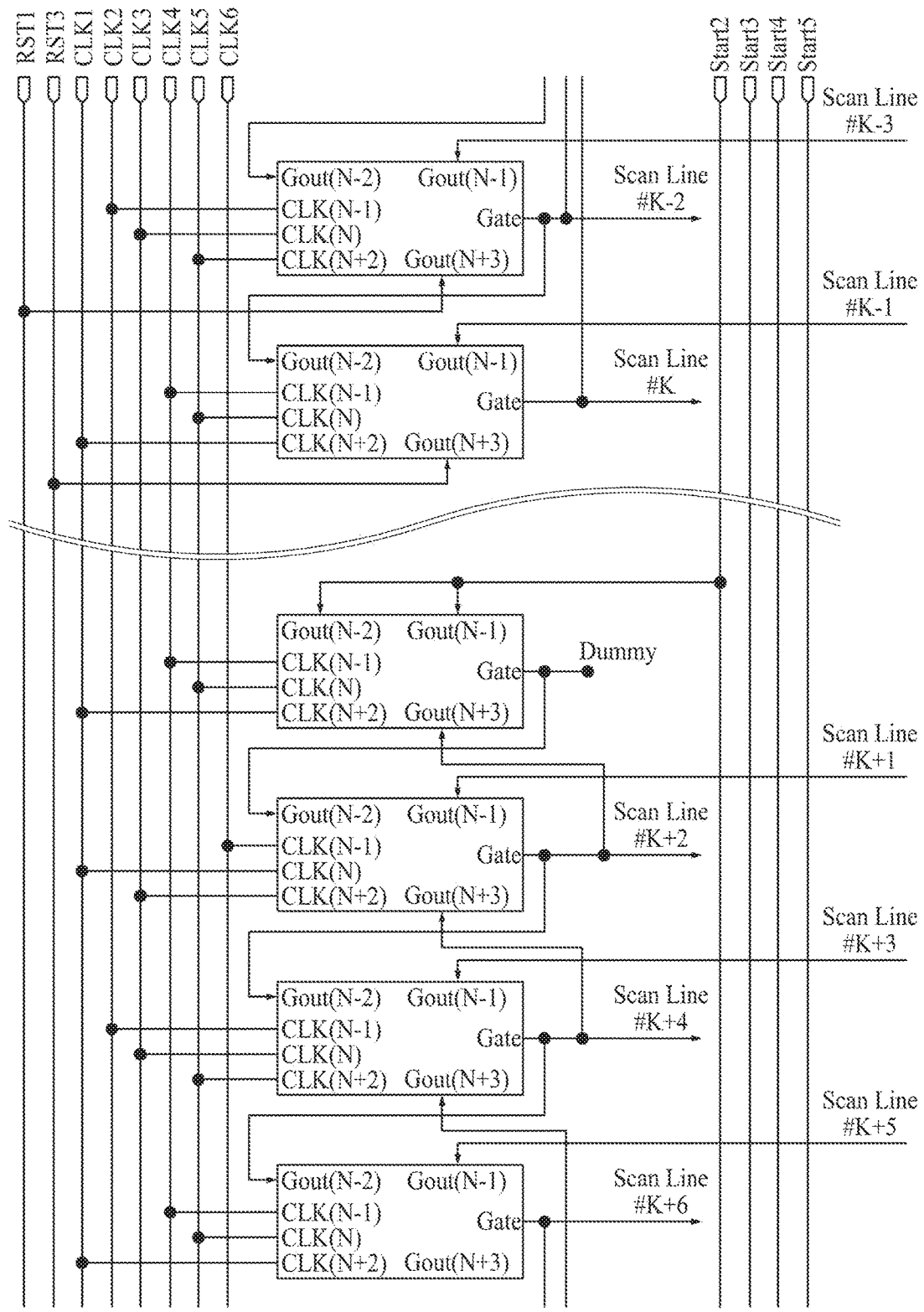
FIG. 16B is an exemplary diagram illustrating an example of a gate driver which allows a scan signal having a certain waveform to be output to gate lines.

FIG. 16B is an exemplary diagram illustrating an example of a gate driver which allows a scan signal having a certain waveform to be output to gate lines, in a stage group which includes a stage (for example, FIG. 15A) receiving a start signal through each of individual terminals and a stage (for example, FIG. 16A) having a structure where terminals receiving an external start signal are connected to each other.

A gate driver illustrated in FIG. 16B includes a plurality of stages configured based on SLC, and particularly, as illustrated in FIG. 16B, a stage where terminals receiving the external start signal are connected to each other is configured as a dummy stage that does not output a scan signal to a gate line.

An output of each of dummy stages driven by an input of the external start signal is input as one of start signals of another stage of a stage group including a corresponding dummy stage. However, an output of the dummy stage is not actually applied as the scan signal to the gate line. Stages which output scan signals to gate lines are stages which receive start signals from other stages.

To provide an additional description, stages other than the dummy stage in each of a plurality of driving areas may each be configured as a stage where terminals receiving start signals are separated from each other as illustrated in FIG. 15A. A first stage that outputs a scan signal to a corresponding gate line may remove noise of a Q node by using an output signal of the dummy stage and may charge the Q node with the output signal of the dummy stage. An initial signal for operating a T3r transistor of each of the stages may be applied through an independent signal line without being connected to an external start signal line.

Therefore, the number of start signals which are provided for dividing a screen into a plurality of driving areas and individually driving the plurality of driving areas is reduced by using the SLC-based stages, and stages which output scan signals to gate lines may be designed in the same structure. For example, dummy stages of each stage group may have the structure illustrated in FIG. 16A, and stages which output scan signals to gate lines may have the structure illustrated in FIG. 15A. The number of dummy stages which are provided for starting driving of each stage group may be variously changed depending on a function of a gate driver.

In a case where a dummy stage is added into each stage group as illustrated in FIG. 16B, as the number of driving areas increases, the number of dummy stages which are to be added into a gate driver increases. However, in the gate driver illustrated in FIG. 16B, the number of external start signal lines which increases for dividing a screen into a plurality of driving areas and individually driving the plurality of driving areas is smaller than the number of external start signal lines in a gate driver which is configured without a dummy stage. In this manner, as the number of external start signal lines decreases, a bezel size of the display device is reduced, and moreover, a process of testing the display device is simplified. Also, by decreasing the number of signals necessary for a division driving function, the number of channels which are to be added into an external circuit board is reduced.

Moreover, since stages which output a scan signal to each of the driving areas are designed in the same circuit structure, stress conditions of the stages are standardized in driving the display device. Therefore, an output deviation of the scan signals caused by a deterioration deviation between the stages is reduced, and moreover, dimming of the gate lines or an image defect occurring between driving areas is prevented.

Figure 17A:
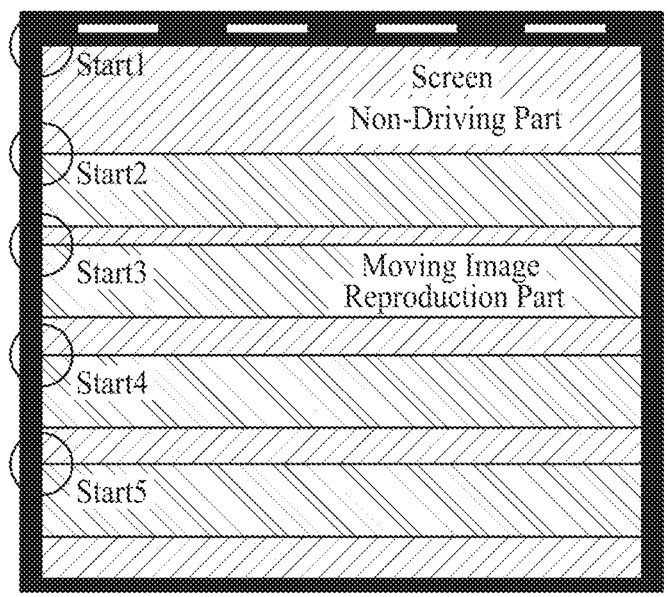
FIG. 17A is an exemplary diagram for describing a method of driving a display device according to an embodiment of the present invention.
Figure 17B:
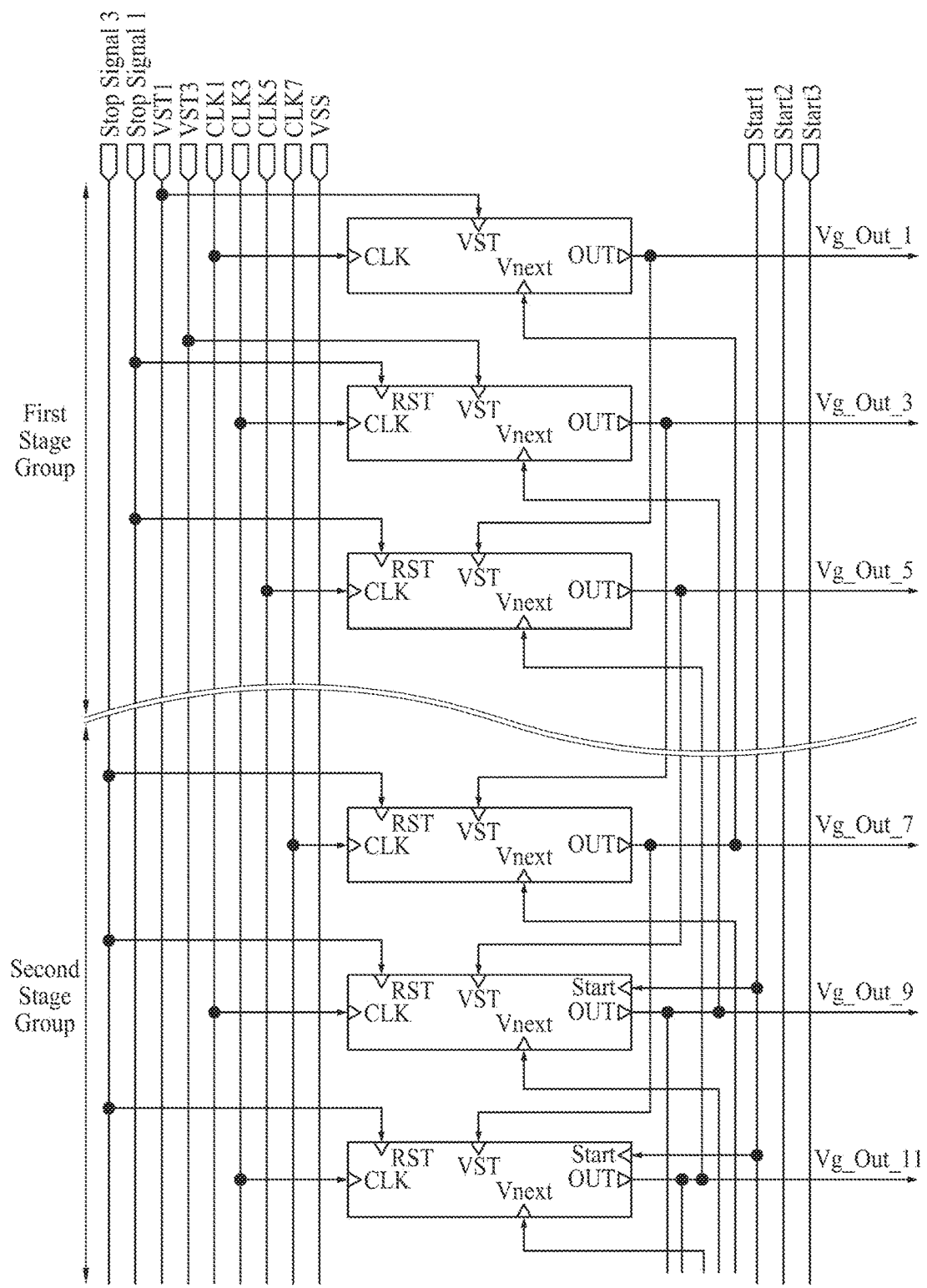
FIG. 17B is an exemplary diagram illustrating a configuration of a gate driver applied to a display device according to an embodiment of the present invention.
Figure 17C:
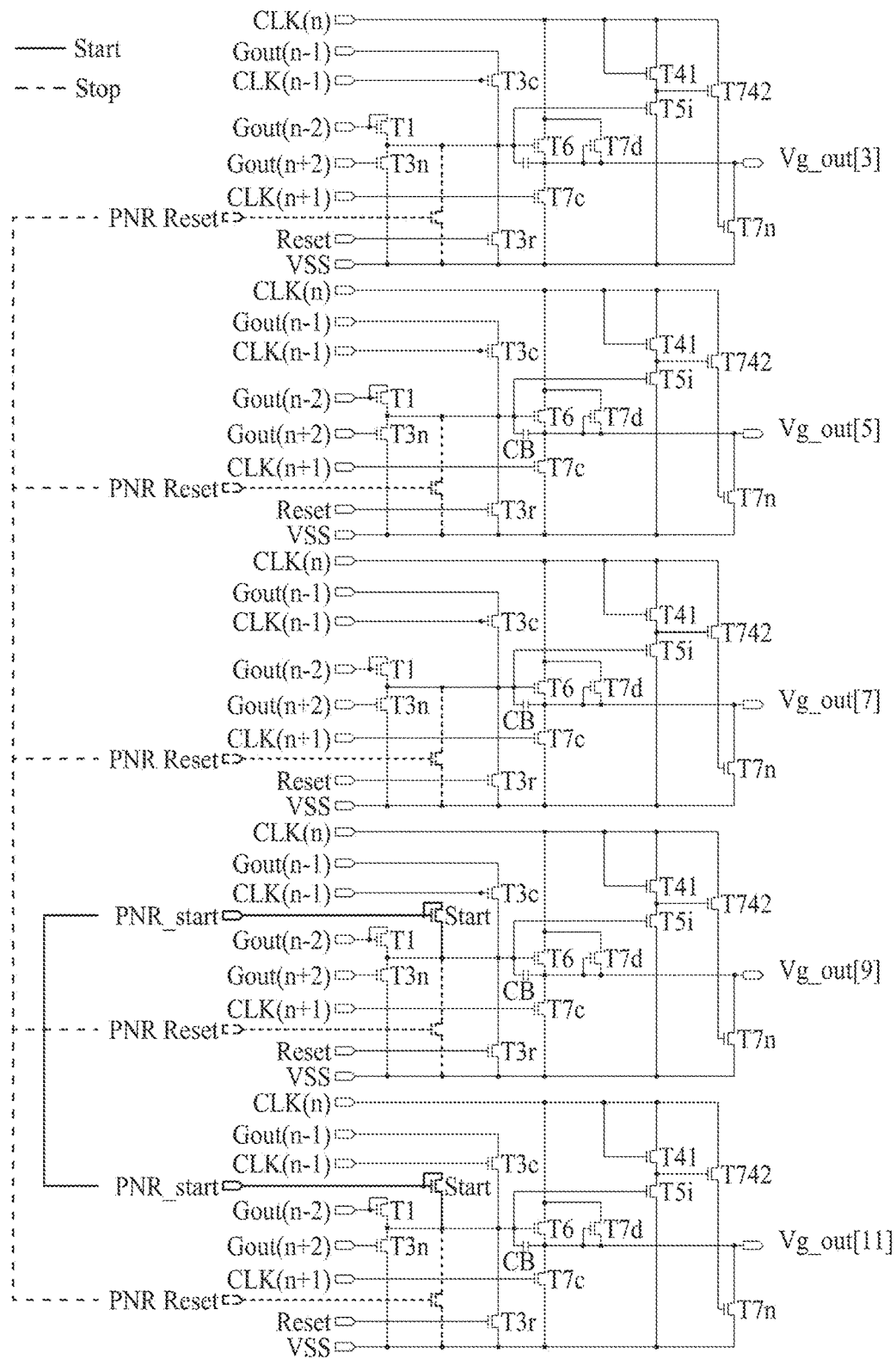
FIG. 17C is an exemplary diagram illustrating a structure of each of stages configuring the gate driver of FIG. 17B.
Figure 17D:
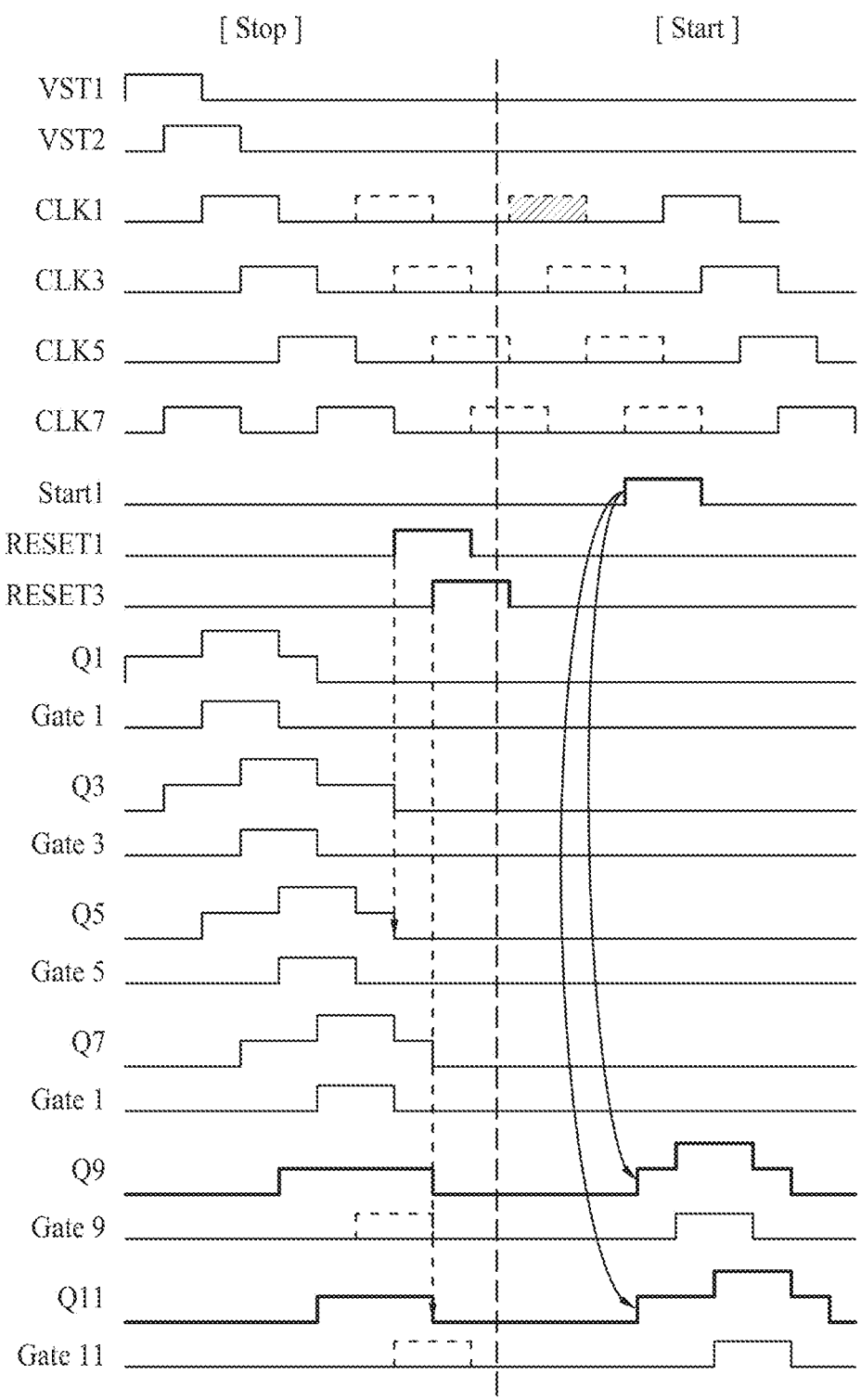
FIG. 17D is an exemplary diagram showing waveforms of signals applied to the gate driver of FIG. 17B.

FIG. 17A is an exemplary diagram for describing a method of driving a display device according to an embodiment of the present invention. FIG. 17B is an exemplary diagram illustrating a configuration of a gate driver applied to a display device according to an embodiment of the present invention. FIG. 17C is an exemplary diagram illustrating a structure of each of stages configuring the gate driver of FIG. 17B. FIG. 17D is an exemplary diagram showing waveforms of signals applied to the gate driver of FIG. 17B.

In the display device according to the present invention, as illustrated in FIG. 17A, each of a plurality of driving areas may include an area on which an image is displayed and an image on which an image is not displayed.

In order to perform such an operation, in some embodiments of the present invention, an output of a scan signal from the gate driver may be controlled through a method of controlling a clock which is to be output as the scan signal, thereby generating a period where touch scan is to be performed or dividing and driving a display area in various forms.

FIG. 17B is an exemplary diagram illustrating a configuration of a gate driver for performing divisional driving through the above-described clock control. Each of a plurality of stage groups may not output a scan signal according to a stop signal, and then, may again output the scan signal according to an external start signal input thereto. By controlling a timing of each of the stop signal and the start signal, a whole area of the panel 110 may be continuously driven as illustrated in FIG. 4A, only a specific driving area may be driven as illustrated in FIG. 4B, and as illustrated in FIG. 17A, one driving area may include an area on which an image is displayed and an image on which an image is not displayed Unlike the above-described other embodiments, in normal driving, a gate driver having a structure illustrated in FIG. 17B may sequentially drive all stages by using one external start signal to output a scan signal, and when touch sensing or divisional driving is necessary, the gate driver may control an output of the scan signal by controlling a clock. For example, in order not to output the scan signal, the stop signal may be supplied to a stage, and in order to output the scan signal again, the external start signal may be supplied to the stage.

In this case, a stage group including a stage to which the stop signal is supplied differs from a stage group including a stage to which the external start signal is supplied. Therefore, the panel 110 may be driven in a form illustrated in FIG. 17A.

For example, one stage group is driven by the external start signal to sequentially output the scan signal, and when the stop signal is supplied to a stage where an output of the scan signal is not desired, the stage supplied with the stop signal does not output the scan signal. Subsequently, when another stage group desires to again output the scan signal, the external start signal is input to the other stage group, and thus, the other stage group sequentially outputs the scan signal.

In the gate driver according to the present embodiment, in a case where one stage group is driven by the external start signal to sequentially output the scan signal, when the stop signal is input to a stage, the stage may not output the scan signal, and then, when the external start signal is input to another stage group, the other stage group may sequentially output the scan signal.

To provide a driving method in more detail with reference to FIGS. 17B and 17C, an nth stage is driven according to a scan signal output from an n−2nd stage and is reset by a scan signal output from an n+2nd stage.

Therefore, in the gate driver illustrated in FIG. 17B, in order for an output of the scan signal to be blocked by the stop signal, as illustrated in FIG. 17B, the stop signal should be supplied to at least two adjacent stages, and the externals start signal should be supplied to a last stage and a first stage of stage groups adjacent to each other.

For example, when the stop signal is supplied to a stage which outputs a seventh scan signal Vg_out7, a stage which outputs a ninth scan signal Vg_out9, and a stage which outputs an eleventh scan signal Vg_out11, a clock input to each of the stages is not output as a scan signal from a corresponding stage.

In this case, the stage which outputs the seventh scan signal Vg_out7 and the stage which outputs the ninth scan signal Vg_out9 are included in a first stage group, and the stage which outputs the eleventh scan signal Vg_out11 is included in a second stage group.

Subsequently, in order to output the scan signal through the second stage group, the external start signal is supplied to the stage which outputs the ninth scan signal Vg_out9 and the stage which outputs the eleventh scan signal Vg_out11. Therefore, stages included in the second stage group may sequentially output the scan signal.

FIG. 17D is a waveform diagram for describing the above-described driving method. As illustrated in FIG. 17D, when two stop signals are supplied to two adjacent stages, the scan signal is not output from the stages. Subsequently, when the external start signal is supplied to a last stage of a stage group where an output of the scan signal is stopped and a first stage of another stage group adjacent to the stage group, the other stage group may sequentially output the scan signal.

Figure 18A:
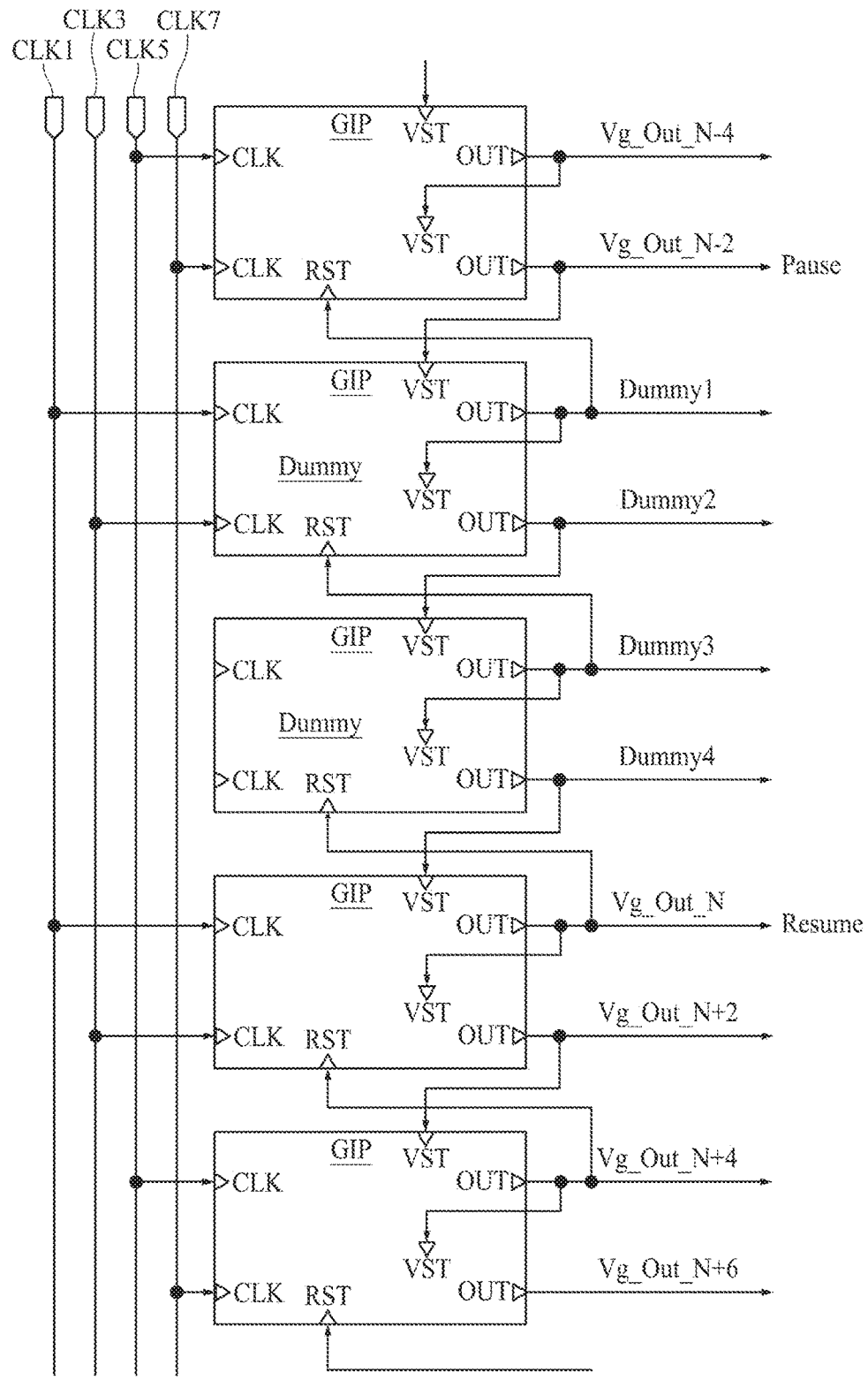
FIG. 18A is an exemplary diagram of a gate driver applied to a display device according to an embodiment of the present invention.
Figure 18B:
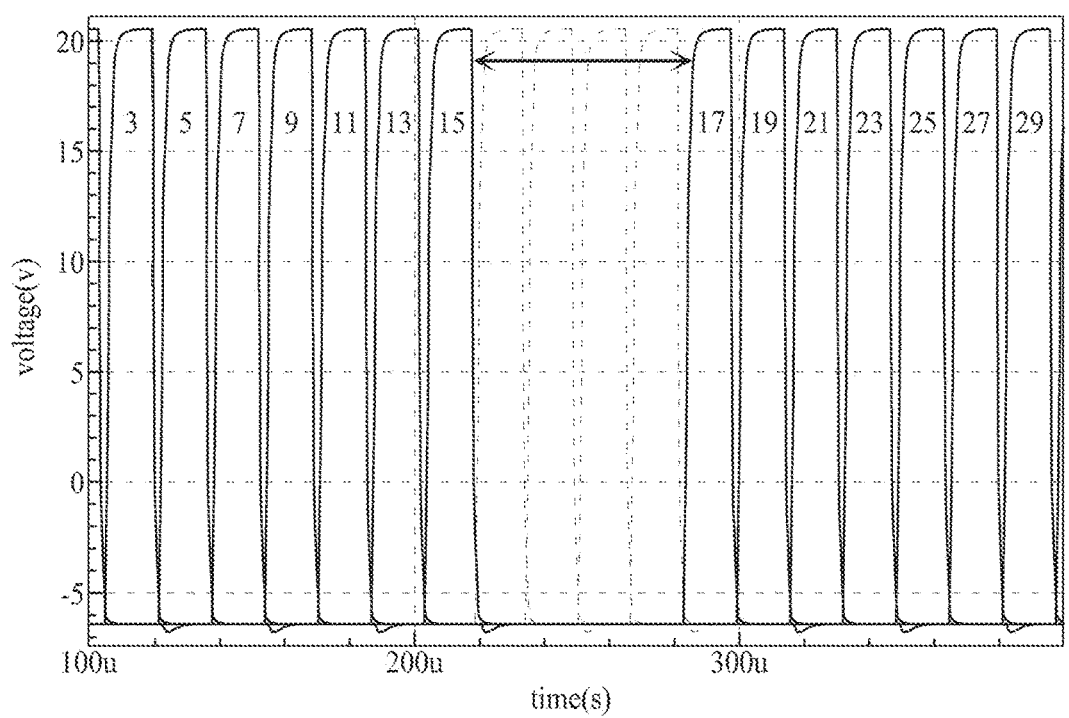
FIG. 18B is an exemplary diagram showing waveforms of signals applied to the gate driver illustrated in FIG. 18A.

FIG. 18A is an exemplary diagram of a gate driver applied to a display device according to an embodiment of the present invention, and FIG. 18B is an exemplary diagram showing waveforms of signals applied to the gate driver illustrated in FIG. 18A.

That is, FIG. 18A is an exemplary diagram illustrating a configuration of another gate driver capable of being applied to a display device for enhancing a touch sensitivity of the display device, and FIG. 18B is an exemplary diagram showing waveforms of scan signals output from the gate driver of FIG. 18A.

One stage group of the gate driver 120, as illustrated in FIG. 18A, may include a plurality of predetermined dummy stages, and a delay period equal to a period where a dummy stage is output from each of the dummy stages may be formed. Unlike the above-described embodiments, in the present embodiment, a driving time of a stage group corresponding to each of a plurality of driving areas is controlled based on the number of the dummy stages and a time when the dummy signal is output.

Referring to FIG. 18A, one stage group may include two dummy stages, and the two dummy stages may output four dummy signals Dummy1 to Dummy4. One of the two dummy stages may output the dummy signals Dummy1 and Dummy2, and the other dummy stage may output the dummy signals Dummy3 and Dummy4. In this case, as shown in FIG. 18B, a delay period equal to a period where the four dummy signals are output may be formed until a fifteenth scan signal is output and then a seventeenth scan signal is output. In this case, a delay interval between stage groups may be set based on the number of the dummy signals.

In this case, since a period where the scan signal is not output is determined based on the positions and number of predetermined dummy stages and the number of dummy signals output from the respective dummy stages, a section where delay occurs when an image is being displayed and a period of the section may be fixed, and for this reason, it is difficult to change the section and the period of the section. However, unlike the above-described embodiments, in the present embodiment, an external start signal line may not be added for controlling an output timing of each area, and even without using a number of dummy stages, a delay period sufficient to perform touch sensing is secured.

TFTs configuring the gate driver 120 applied to the embodiments described herein may each be implemented as an oxide TFT, for example, indium gallium zinc oxide (IGZO). The oxide TFT is better in mobility characteristic of a current than an amorphous silicon (a-Si) TFT, and thus, when the oxide TFT is applied, a size of a circuit is reduced. Moreover, a leakage current of the oxide TFT is lower than that of each of the a-Si TFT and an LTPS TFT. Therefore, as in the display device according to embodiments of the present invention or a gate driver that allows one driving area of the display area 100 to be driven at a frame rate lower than that of another driving area, if the oxide TFT is applied to a gate driver that does not output a scan signal temporarily, the gate driver is more stably driven.

However, the gate driver according to embodiments of the present invention may be implement with the a-Si TFT or the LTPS TFT, in addition to the oxide TFT. Also, the gate driver or a TFT substrate may be implemented by a combination of the a-Si TFT, the LTPS TFT, and the oxide.

Figure 19:
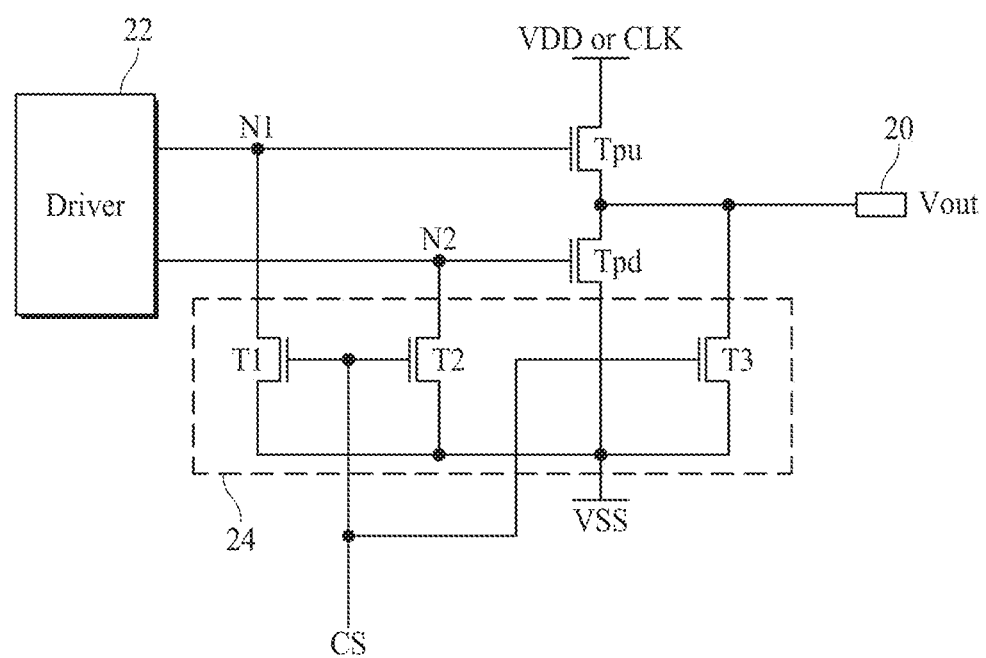
FIG. 19 is an exemplary diagram illustrating a configuration of a node controller applied to a display device according to the present invention.

FIG. 19 is an exemplary diagram illustrating a configuration of a node controller applied to a display device according to the present invention.

The gate driver 120 includes a plurality of stages as described above, and each of the stages is configured with a plurality of TFTs. The stage should stably maintain a voltage of a gate line connected thereto. However, while the gate driver 120 is being driven, some nodes included in each stage may be in a floating state and can be affected by external noise, causing abnormal driving where a voltage of a corresponding gate line changes, and/or the like.

Moreover, as described herein, in a case of applying a driving method where driving of some driving areas is temporarily stopped and then starts again, a lifetime of each of the TFTs included in each stage is shortened due to a stress caused by residual electric charges remaining in nodes which is in the floating state. Particularly, in TFTs which use an oxide semiconductor, since an off current is very low, a very long time is taken until the residual electric charges are naturally discharged. For this reason, a time for which the stress caused by the residual electric charges is applied to a TFT using an oxide semiconductor increases.

Therefore, according to the present invention, as illustrated in FIG. 19, a node controller 24 may be added into each stage, and the node controller 24 controls a floating node to a specific stage and minimizes residual electric charges. Therefore, the gate driver 120 is more stably driven, and the lifetime and reliability of each of the transistors configuring the gate driver 120 increase. In this case, a driver 22 of FIG. 19 may perform a function of generating a signal for driving a pull-up transistor Tpu or a pull-down transistor Tpd, and for example, may include an area illustrated in FIGS. 15A and 15B.

According to the present invention, the gate driver 120 may control the floating node to a specific state by using the node controller 24, and thus, a voltage of a gate line is stabilized irrespective of noise. Also, according to the present embodiment, a pull-up transistor and a pull-down transistor may be turned off for a certain time by using the node controller 24, thereby enhancing the lifetime and reliability of each of the TFTs. Also, according to the present embodiment, the node controller 24 may remove residual electric charges when the supply of power is stopped, thereby enhancing the lifetime of each of the TFTs.

Particularly, in the above-described embodiments, since the voltage of the gate line is stabilized by the node controller 24, the voltage of the gate line is stabilized even in a period where a data voltage is not output.

To provide an additional description, the node controller 24 to be described below may be applied to each of the stages configuring the gate driver 120 according to embodiments of the present invention, and thus, even in a period where the scan signal is not output to the gate line, the voltage of the gate line is stabilized, and the coincidence of deterioration of transistors caused by residual electric charges is reduced.

A control signal CS input to the node controller 24 may be input to the node controller 24 at various timings, based on a structure and a function of the stage. Particularly, as in the above-described methods of driving the gate driver, when driving of some stage groups is stopped, the control signal CS may be applied to a node controller of each of stages of a stage group where driving is stopped.

First, referring to FIG. 19, a stage applied to the present invention includes a pull-up transistor Tpu, a pull-down transistor Tpd, a driver 22, and the node controller 24. The pull-up transistor Tpu is connected between a first signal line and an output terminal 20. Here, a clock signal CLK may be supplied to the first signal line. A gate of the pull-up transistor Tpu is connected to a first node N1, namely, a Q node. The pull-up transistor Tpu supplies the clock as a scan signal to the output terminal 20 according to a voltage of the first node N1.

The pull-down transistor Tpd is connected between the output terminal 20 and a second signal line through which a low-level voltage VSS is supplied. Also, a gate of the pull-down transistor Tpd is connected to a second node N2, namely, a QB node. The pull-down transistor Tpd supplies the low-level voltage VSS to the output terminal 20 according to a voltage of the second node N2.

The driver 22 controls the voltage of each of the first and second nodes N1 and N2 according to signals supplied through one or more signal lines (not shown). The driver 22 may control the voltage of each of the first and second nodes N1 and N2 to alternately turn on or off the pull-up transistor Tpu and the pull-down transistor Tpd.

The node controller 24 controls the voltage of each of the first and second nodes N1 and N2 and a voltage at the output terminal 20 separately from the driver 22. For example, the node controller 24 may supply a certain voltage (for example, the low-level voltage VSS) to the first node N1, the second node N2, and the output terminal 20 according to a control signal CS.

When the low-level voltage VSS is supplied to the first node N1 and the second node N2, the pull-up transistor Tpu and the pull-down transistor Tpd are set to a turn-off state. Also, when a voltage of a low-level voltage source is supplied to the output terminal 20, the output terminal 20 holds the low-level voltage VSS.

The node controller 24 includes first to third transistors T1 to T3.

The first transistor T1 is connected between a first node N1 and a low-level voltage source, and the second transistor T2 is connected between a second node N2 and the low-level voltage source. The third transistor T3 is connected between an output terminal 20 and the low-level voltage source. The first to third transistors T1 to T3 of the node controller 24 are turned on or off according to a control signal CS.

The control signal CS may be set to a low-level voltage VSS, a high voltage (VGH) of the clock, a voltage equal to or higher than the high voltage (VGH) of the clock, or a certain voltage between the low-level voltage VSS and the high voltage (VGH) of the clock.

To provide an additional description, the node controller 24 may supply the low-level voltage VSS to the first node N1 or the second node N2, which is maintained in a floating state, according to the control signal CS, thereby preventing an abnormal signal from being supplied to the first node N1 or the second node N2. Therefore, in the above-described embodiment of the present invention, the voltage of the gate line is stably maintained even in a delay period where an image is not displayed. Also, by discharging residual electric charges to the first node and the second node, deterioration of the transistors connected to each of the nodes is prevented.

Hereinabove, the node controller 24 has been described as being connected to the first node N1 connected to the pull-up transistor Tpu or the second node N2 connected to the pull-down transistor Tpd. However, the node controller 24 may be connected to nodes which are maintained in the floating state, in addition to the first node N1 and the second node N2 and may supply a specific voltage to a floated node. Accordingly, an abnormal signal is prevented from being supplied to a floated node among nodes configuring a stage, and thus, the voltage of the gate line is stably maintained, thereby preventing the transistors connected to floated nodes from being deteriorated.

Those skilled in the art can understand that the present invention can be embodied in another detailed form without changing the technical spirit or the essential features. Therefore, it should be understood that the embodiments described above are exemplary from every aspect and are not restrictive. It should be construed that the scope of the present invention is defined by the below-described claims instead of the detailed description, and the meanings and scope of the claims and all variations or modified forms inferred from their equivalent concepts are included in the scope of the present invention.

The invention claimed is:

1. A display device comprising:
   a panel having a plurality of gate lines and a plurality of data lines;
   a data driver supplying data voltages to the plurality of data lines arranged in the panel;
   a gate driver including a plurality of stage groups that are driven by independent external start signals to output scan signals to the plurality of gate lines, and
   a timing controller configured to control the data driver not to output the data voltages to the plurality of data lines until (i) a start signal is supplied to one stage group of the plurality of stage groups, (ii) scan signals are output from the one stage group, and (iii) another start signal is supplied to another stage group,
   wherein each of the plurality of stage groups comprises a stage disallowing a clock to be output as a scan signal responsive to receiving a stop signal.

2. The display device of claim 1, wherein:
   a first stage included in each of the plurality of stage groups is supplied with and driven by at least one external start signal to output a scan signal, and
   in each of the plurality of stage groups, each of stages other than the first stage is supplied with and driven by a scan signal of a previous stage in each of the stages to output a scan signal.

3. The display device of claim 2, wherein a last stage in each of the plurality of stage groups outputs a scan signal that is reset by an external reset signal.

4. The display device of claim 1, wherein a start signal is supplied as a scan signal to a gate line connected to a first stage of a plurality of stages included in each of the plurality of stage groups and is supplied to an input terminal of a second stage.

5. The display device of claim 1, wherein each of the plurality of stage groups comprises at least one dummy stage that resets another stage included in each of the plurality of stage groups, the at least one dummy stage reset by an external reset signal.

6. The display device of claim 1, wherein the gate driver is simple logic circuit (SLC) and includes a plurality of stages without a QB-node.

7. The display device of claim 6, wherein a stage receiving an external start signal among a plurality of stages included in each of the plurality of stage groups is connected to at least two external start signal lines.

8. The display device of claim 6, wherein a stage in each of the plurality of stage groups is connected to an external start signal line to receive an external start signal.

9. The display device of claim 8, wherein the stage connected to the external start signal line is a dummy stage that outputs a start signal to another stage in each of the plurality of stage groups, an output terminal of the dummy stage disconnected from the gate lines.

10. The display device of claim 1, wherein two adjacent stages in each of the plurality of stages share a QB-node.

11. The display device of claim 1, further comprising:
   a plurality of touch electrodes; and
   a touch driver supplying a touch voltage to the plurality of touch electrodes to determine a touch on the panel after scan signals are output from a stage group and before scan signals are output from a subsequent stage group.

12. A display device comprising:
   a panel having a plurality of gate lines; and a gate driver including a plurality of stage groups configured to supply scan signals to the plurality of gate lines,
wherein independent start signals are each supplied to a corresponding stage group but not to other stage groups to cause stages in the corresponding stage group to output scan signals, and at least one of the plurality of stage groups is supplied with a start signal to output scan signals in a frame period,
each of the plurality of stage groups comprises a node controller that supplies a voltage to a floating node to turn off a transistor connected to the floating node, and
each of the plurality of stage groups comprises at least one stage configured to discontinue outputting a scan signal responsive to receiving a stop signal.

13. The display device of claim 12, wherein the start signal is supplied to the at least one stage group of the plurality of stage groups, and whether the panel is touched is determined after scan signals are output from a stage group responsive to a start signal and before another start signal is output from another stage group.

14. A method of driving a display device, the method comprising:
receiving a first start signal at a gate driver connected to gate lines of a panel during a first frame period;
sequentially transmitting first scan signals from the gate driver to a first subset of the gate lines responsive to receiving the first start signal;
receiving a second start signal at the gate driver during a second frame period but not during the first frame period, the second start signal separate from the first start signal;
sequentially transmitting second scan signals from the gate driver to a second subset of the gate lines responsive to receiving the second start signal, and
detecting a touch on the panel after the first scan signals are transmitted but before the second scan signals are transmitted,
wherein a data driver is controlled not to output data voltages to a plurality of data lines until (i) the first start signal or the second start signal is supplied to the gate driver and (ii) scan signals are output from the gate driver.

15. The method of claim 14, wherein the first and second start signals are received from a timing controller.

16. A display device comprising:
a panel having pixels and gate lines coupled to gates of transistors in the pixels; and
a gate driver including at least a first stage group and a second stage group, the first stage group including stages configured to sequentially transmit first scan signals via the gate lines responsive to receiving a first start signal, the second stage group including stages configured to sequentially transmit second scan signals via the gate lines responsive to receiving a second start signal separate from the first start signal,
wherein the gate driver is a simple logic circuit (SLC) and includes a plurality of stages without a QB-node or is a half dual pull-down AC (HDAC)-based circuit, and the first stage group sends the first scan signals to a first area of the panel to operate the first area of the panel at a first frequency and the second stage group sends the second scan signals to a second area of the panel to operate the second area of the panel at a second frequency different from the first frequency.

17. The display device of claim 16, further comprising a timing controller configured to generate and transmit the first and second start signals to the gate driver.

18. The display device of claim 16, wherein a stage of the first stage group or the second stage group has an input terminal coupled to an output terminal of a previous stage in a same stage group as the stage to receive a scan signal output from the previous stage, wherein the stage is configured to generate another scan signal responsive to receiving the scan signal output from the previous stage.

19. The display device of claim 18, wherein a first stage of the first stage group is configured to receive the first start signal, and a first stage of the second stage group is configured to receive the second start signal.

20. The display device of claim 18, wherein an output terminal of the first stage of the second stage group is connected to receive the second start signal, and a second stage of the first stage group has an input terminal connected to the output terminal of the first stage to receive the second start signal.

21. The display device of claim 18, wherein a last stage of the first stage group and a last stage of the second stage group are configured to receive reset signals from a timing controller.

22. The display device of claim 16, further comprising a touch driver providing voltage signals to touch electrodes in the panel after transmitting the first scan signals and before transmitting the second scan signals during a screen driving time between blanking times.

23. The display device of claim 16, wherein the first stage groups or the second stage groups comprises a dummy stage having an input terminal configured to receive a reset signal, an output terminal of the dummy stage disconnected from the gate lines but connected to a reset terminal of a stage preceding the dummy stage.

24. The display device of claim 16, wherein the first stage group or the second stage group comprises at least one stage configured to discontinue outputting a scan signal responsive to receiving a stop signal.

25. The display device of claim 24, wherein at least two adjacent stages in the first stage group or the second stage group receive the stop signal at input terminals.

26. The display device of claim 16, wherein the first stage group or the second stage group comprises at least one stage configured to discontinue outputting a scan signal responsive to receiving a stop signal.

27. The display device of claim 16, wherein at least one stage of the first and second stage groups comprises a node controller that connects a floating node to a reference voltage.

* * * * *